US012614887B2

(12) United States Patent
Edwards et al.

(10) Patent No.: US 12,614,887 B2
(45) Date of Patent: Apr. 28, 2026

(54) TEMPORAL CONTRAST IMPROVEMENT FOR SHORT PULSE LASERS VIA IONIZATION GRATINGS

(71) Applicant: Lawrence Livermore National Security, LLC, Livermore, CA (US)

(72) Inventors: Matthew Reid Edwards, Santa Monica, CA (US); Pierre A. Michel, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 676 days.

(21) Appl. No.: 17/882,421

(22) Filed: Aug. 5, 2022

(65) Prior Publication Data

US 2024/0047930 A1    Feb. 8, 2024

(51) Int. Cl.
*H01S 3/00*        (2006.01)
*H01S 3/08*        (2023.01)

(52) U.S. Cl.
CPC ........ *H01S 3/0057* (2013.01); *H01S 3/08009* (2013.01)

(58) Field of Classification Search
CPC ..... H01S 3/005; H01S 3/0057; H01S 3/08009
See application file for complete search history.

(56) References Cited

U.S. PATENT DOCUMENTS 5,130,849 A    7/1992  Valley et al.
5,303,032 A    4/1994  Uesu et al.

FOREIGN PATENT DOCUMENTS

CN          107123925 A      9/2017
CN          113960015 A      1/2022
JP        2000-329920 A     11/2000
JP         2008052266    *   3/2008
WO    WO 2024/144834        7/2024

OTHER PUBLICATIONS

Liu et al., "Femtosecond pulses cleaning by transient-grating process in Kerr-optical media," 2011, Chin. Opt. Lett. 9, 051903, p. 1-3. (Year: 2011).*
Suntsov et al., "Femtosecond laser induced plasma diffraction gratings in air as photonic devices for high intensity laser applications," Jun. 2009, Appl. Phys. Lett. , vol. 94, pp. 251104-1-251104-3. (Year: 2009).*
M. R. Edwards, UltraFast Sources of Intense Radiation, PhD Thesis, Princeton University, 2019.

(Continued)

*Primary Examiner* — Michael Carter
(74) *Attorney, Agent, or Firm* — Knobbe, Martens, Olson & Bear, LLP

(57)                    ABSTRACT

A diffractive optical element, such as a plasma grating, can be made by directing two laser beams so that they overlap in a nonlinear material to form an interference pattern in the nonlinear material. The interference pattern can modify the index of refraction in the nonlinear material to produce the diffractive optical element. This diffractive optical element may be used to separate the peak of a laser pulse from light preceding the peak thereby increase the temporal contrast of a laser pulse such as a compressed laser pulse.

20 Claims, 6 Drawing Sheets

(56)　　　References Cited

OTHER PUBLICATIONS

Mikhailova et al., Ultra-high-contrast few-cycle pulses for multipetawatt-class laser technology, Optics Letters, vol. 36, No. 16, 2011.

Jullien et al., $10^{-10}$ Temporal contrast for femtosecond ultraintense lasers by cross-polarized wave generation, Optics Letters, vol. 30, No. 8, 2005.

Chvykov et al., Generation of $10^{11}$ contrast 50 TW laser pulses, Optics Letters, vol. 31, No. 10, 2006.

Fourmaux et al., Pedestal cleaning for high laser pulse contrast ratio with a 100 TW class laser system, Optics Express, vol. 19, No. 9, 2011.

Yu et al., Generation of high-contrast, 30 fs, 1.5 PW laser pulses from chirped-pulse amplification Ti:sapphire laser, Optics Express, 10807-10815,Apr. 2012.

Wang et al., 0.85 PW laser operation at 3.3 Hz and high-contrast ultrahigh-intensity $\lambda = 400$ nm second-harmonic beamline Optics Letters, vol. 42, No. 19, 2017.

Kim et al., Spatio-temporal characterization of double plasma mirror for ultrahigh contrast and stable laser pulse, Appl Phys B (2011) 104:81-86.

Suntsov et al., Femtosecond laser induced plasma diffraction gratings in air as photonic devices for high intensity laser applications, Applied Physics Letters, vol. 94, 2009.

Shi et al., Generation of High-Density Electrons Based on Plasma Grating Induced Bragg Diffraction in Air, Physical Review Letters, vol. 107, 2011.

Edwards et al., A multi-terawatt two-color beam for high-power field-controlled nonlinear optics, Optics Letters, vol. 45, No. 23, pp. 6542-6545, 2020.

Choi et al., Simultaneous generation of ions and high-order harmonics from thin conjugated polymer foil irradiated with ultrahigh contrast laser, Applied Physics Letters 99, 181501 (2011).

International Search Report and Written Opinion Received in PCT Application No. PCT/US2023/029321 as mailed Aug. 27, 2024 in 7 pages.

Schmid et al., "Ultrafast transient grating in Barium Fluoride: efficient instantaneous optical switching, frequency conversion and simple logic operations on a femtosecond time scale," Optical Society of America, 2001.

Edwards et al., "Greater than Five-Order-of-Magnitude Postcompression Temporal Contrast Improvement with an Ionization Plasma Grating," Physical Review Letters 133, 155101-1 to -6, published Oct. 8, 2024, with Physical Review Letters—Guidelines for Referees.

* cited by examiner

TEMPORAL CONTRAST IMPROVEMENT FOR SHORT PULSE LASERS VIA IONIZATION GRATINGS

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field of the Disclosure

Some implementations disclosed herein relate to tailoring the temporal characteristics of laser pulses using plasma gratings such as ionization gratings and more particularly to increasing the temporal contrast of laser pulses incident on the gratings by delaying the onset of the plasma grating with respect to the laser pulse to remove extraneous laser emission.

Description of the Related Art

The temporal contrast of a high-power laser is a measure of the difference in magnitude between the primary or main pulse of light and any pre-pulses or longer duration emission from the laser that precedes the main pulse's arrival on a target. Many experiments and applications are sensitive to this parameter because for a high-power laser, even a relatively weak pre-pulse can contain significant energy.

One method for post-compression contrast improvement is a plasma mirror. See, for example, M. R. Edwards et al., Optics Letters, vol. 45, no. 23, pp. 6542-6545, 2020. Additional methods, however, for attenuating such pre-pulses and other laser emission that precedes the main pulse, thereby increasing the temporal contrast of high-power laser pulses, may be desirable.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

The present application describes apparatus and methods for potentially improving temporal contrast of laser pulses, for example, by attenuating pre-pulses and/or other laser emissions that precede the main peak of the laser pulse. Various configurations include two "pump" beams and a "probe" beam, the later possibly being a compressed high-power pulse, for which the temporal contrast will be increased. In certain implementations, the two pump beams cross and optically interfere under vacuum in a gas or other non-ionized medium, ionizing and altering the refractive index of portions of the medium but not others, thereby creating an ionization grating. In various implementations, application of the pump beams are delayed with respect to the laser pulse in the probe beam by a small amount of time (e.g., <1 ps), which coincides with a small delay (e.g., <1 ps) of the main peak of the probe pulse with respect to other laser light preceding the peak (such as pre-pulses and possibly a pedestal). Accordingly, the main peak will arrive at the onset of the formation of the ionization grating and diffract from the ionization grating. In contrast, pre-pulses and/or other laser light preceding the main peak will already have passed through the non-ionized gas before the pump beams arrive and induce the formation of the ionization grating and will not be diffracted. The diffracted main peak of the probe can thereby be separated from any pre-pulses and possibly other light preceding the peak, and thus, the main peak can be the first light arriving at a downstream target.

Similarly, various implementations described herein include a laser system for attenuating pre-pulses and other laser emissions that precede the main peak of the laser pulse. Such a laser system can comprise a medium, such as a gas, a supply configured to provide a medium, or a support configured to hold the medium, such as a solid. The medium is able to be altered (e.g., ionized) with light. The laser system also includes at least one laser and optics configured to provide first and second laser beams. Each beam comprises a plurality of laser pulses. The laser and the optics are arranged such that the first and second laser beams are disposed with respect to each other and with respect to the medium so that individual pulses from the first laser beam interfere with individual pulses from the second laser beam to form an interference pattern on the medium for a limited time to cause the medium to form a transient diffraction grating. The at least one laser and optics are also configured to provide a third beam comprising a plurality of pulses that pass through the transient diffraction grating such that a portion of the third beam is diffracted by the diffraction grating. Individual ones of the laser pulses in the third beam that are incident on the transient diffraction grating comprise a peak accompanied by some light that precedes the peak. The first and second laser beams each have an optical path distance to the location where the diffraction grating is formed, and the third laser beam has an optical path distance to the location where the diffraction grating is formed to cause the transient formation of the diffraction grating to be delayed in time with respect to the laser pulses in the third beam incident thereon so as to diffract the peak in the laser pulses in the third beam and reduce the amount of the light preceding the peak in the third beam that is diffracted by the transient diffraction grating.

In various such implementations, the diffraction grating comprises an ionization grating formed by the ionization of matter in regions of the medium corresponding to bright fringes in the interference pattern. In various implementations, the medium comprises a gas and the supply comprises a gas line and/or conduit. In some implementations, the at least one laser comprises a single laser that is configured to produce the first, second, and third laser beams. In some implementations, the laser system comprises an adjustable optical delay disposed in an optical path of light from the at least one laser to cause the transient formation of the diffraction grating to be delayed in time with respect to the laser pulses in the third beam so as to diffract the peak in the laser pulses in the third beam and reduce the amount of the light preceding the peak in the pulses in the third beam that is diffracted by the transient diffraction grating. In some implementations, an optical detector that is configured to receive at least a portion of the diffracted third beam is electrically connected to control electronics that are configured to assess the temporal contrast of the laser pulses in the diffracted third laser beam and alter the adjustable optical delay to increase the temporal contrast by reducing the light preceding the peak in the laser pulses of the third laser beam diffracted by the transient grating.

Some implementations disclosed herein can relate to an optical system for increased temporal contrast increasing the temporal contrast in laser pulses. Such a system can comprise a medium, such as a gas, a supply configured to provide a medium, or a support configured to hold the medium, such as a solid. The medium is able to be altered (e.g., ionized) with light. The system may further comprise optics configured to receive at least one pulsed laser beam and to provide first and second laser beams. Each of the first and second laser beams comprise a plurality of laser pulses. The optics are arranged such that the first and second laser beams are disposed with respect to each other and with respect to the medium so that individual pulses from the first laser beam interfere with individual pulses from the second laser beam to form an interference pattern on the medium for a limited time to cause the medium to form a transient diffraction grating. The optics are also configured to provide a third beam comprising a plurality of pulses that pass through the transient diffraction grating such that a portion of the third beam is diffracted by the diffraction grating. Individual ones of the laser pulses in the third beam that are incident on the transient diffraction grating comprise a peak accompanied by some light just prior in time to the peak. The first and second laser beams each have an optical path distance to the location where the diffraction grating is formed, and the third laser beam also has an optical path distance to the location where the diffraction grating is formed to cause the transient formation of the diffraction grating to be delayed in time with respect to the laser pulses in the third beam incident thereon so as to diffract the peak in the laser pulses in the third beam and reduce the amount of the light preceding the peak in the third beam that is diffracted by the transient diffraction grating.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

FIG. 2 also show the ionization grating diffracting a third laser beam incident thereon.

FIG. 5 also shows an adjustable optical delay through which the third laser beam passes. Control electronics receives input from an optical detector that monitors the diffracted beam. The control electronics can thereby assess the temporal contrast of the diffracted pulses and output a signal to the adjustable optical delay to change the delay of the optical pulses in the third laser beam and their timing with respect to the formation of the transient diffraction grating to increase the temporal contrast by reducing the amount of light preceding the peak in the laser pulses of the third laser beam that is diffracted by the transient grating.

DETAILED DESCRIPTION OF CERTAIN EMBODIMENTS

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
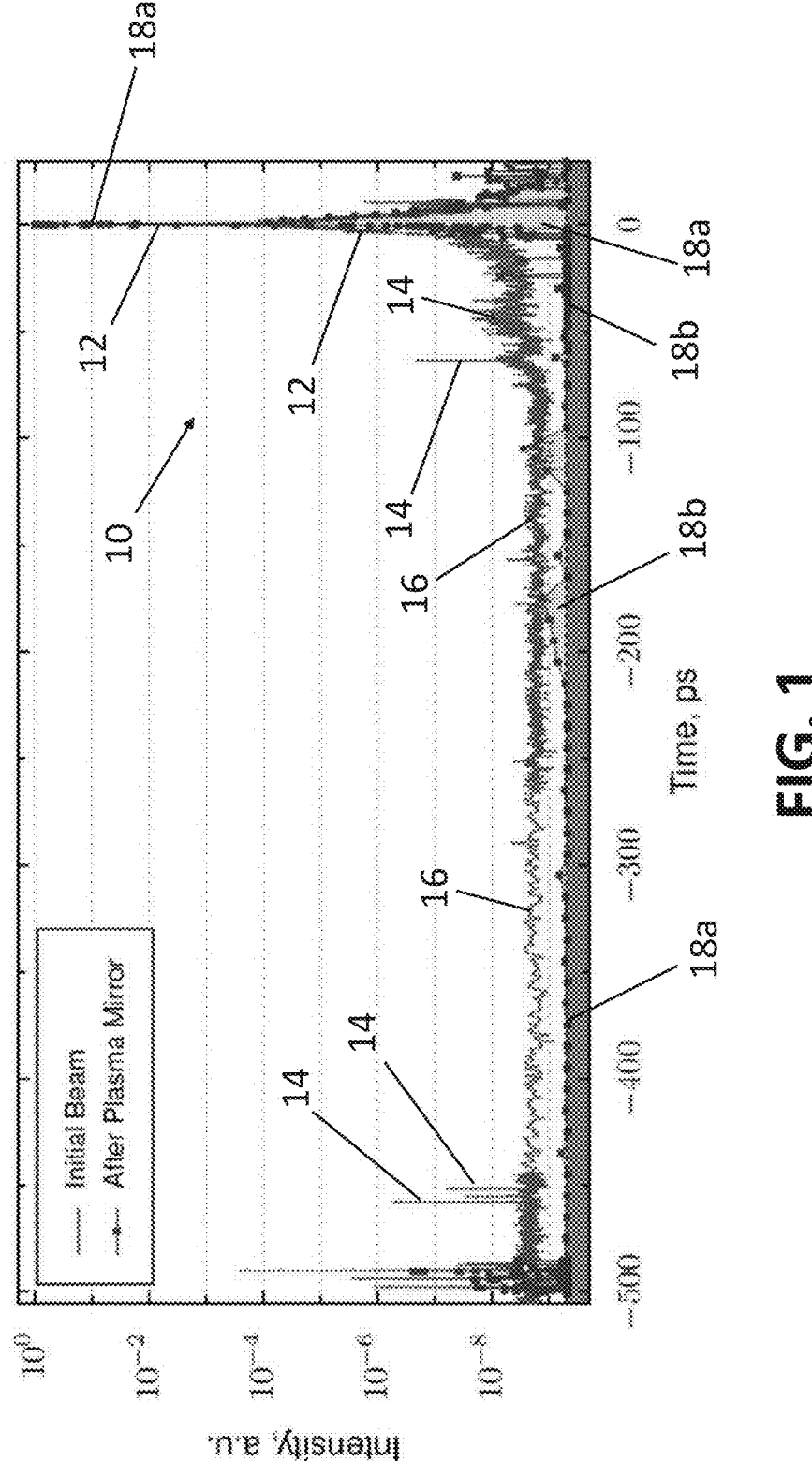
FIG. 1 is a plot of an example laser pulse, on axes of intensity (in arbitrary units) versus time (in picoseconds), showing the peak of the laser pulse preceded by pre-pulses and more continuous and/or more constant emission from the laser.

High-power short-pulse lasers are generally described by the duration of their 'pulse'. Assuming that the pulse shape is Gaussian, this can be specified with a single number: usually the full-width-half-maximum (FWHM) extent in time. For some of the highest peak power lasers today, in some cases, this value can be from 20 to 50 femtoseconds. However, a real laser pulse is far more complex than an idealized Gaussian, and the brief high-intensity peak can be accompanied by a string of pre- and post-pulses of varying magnitude, as well as a longer duration plateau of elevated intensity. An example of a laser pulse 10 having a main peak 12 with pre-pulses 14 and a longer duration plateau or pedestal of light intensity 16 is illustrated in FIG. 1. FIG. 1 is a plot, on axes of intensity (in arbitrary units) versus time (in picoseconds), showing the peak 12 of the laser pulse 10 preceded by pre-pulses 14 and more constant elevated emission 16 from a laser. The main peak 12 is at 0 picosecond (ps) and normalized to 1 or $10^0$ arbitrary units as a reference. The pre-pulses 14 occur earlier in time than the main peak 12 and thus are shown at negative times with respect to the main peak 12. As shown, consecutive pulses in the laser beam are spaced apart by a period in time, and the time separating the pre-pulse from said peak is less than said period between consecutive pulses in the laser beam. Pre-pulses 14, for example, are seen at –60 to –70 ps as well as –450 to –470 ps and at about 490 ps with respect to the main peak 12 at 0 ps. The previous main laser pulse may be at about –100 milliseconds corresponding to a repetition rate of 10 HZ. This additional structure can be generated by parasitic reflections inside the laser, amplified spontaneous emission, and/or imperfect compression (if the pulses was previously compressed) and can be an intrinsic part of high-power laser systems. Often, this structure cannot be entirely removed, even with almost perfect laser design and alignment.

Many applications are sensitive to this additional structure, so its suppression is a problem of relevance for high-power laser science. If the main pulse is focused to $10^{20}$ W/cm$^2$, even a pre-pulse with six orders of magnitude less energy can cause early ionization and distort the target. As a result, techniques for reducing the magnitude of pre-pulses and the plateau for high power lasers are described herein.

FIG. 1 also shows, on the same intensity versus time plot, the laser pulse 10 when a plasma mirror is used to attenuate the pre-pulses and other laser emission that precedes the peak of the pulse. The intensity of the peak 18a is high in comparison to the laser emissions 18b preceding the peak, which are noticeably reduced by use of the plasma mirror. For additional information regarding plasma mirrors and the resultant attenuation of the pre-pulse and laser emission that precedes the peak of the laser pulse, see, e.g., M. R. Edwards et al., Optics Letters, vol. 45, no. 23, pp. 6542-6545, 2020.

The usefulness of methods for improving temporal contrast can be characterized by two primary metrics: the efficiency (i.e., how much of the energy in the peak pulse is kept) and the contrast improvement (by how much are the pre-pulses suppressed, e.g., compared to the main peak). Another secondary metric is the turn-on time: how quickly does the device transition from not diffracting to diffracting, which is important because pre-pulses often arrive only picoseconds before the main pulse.

Advantageously, ionization gratings can be rapidly turned-on and thus offer an approach for suppressing pre-pulses and other optical energy that is emitted prior to the pulse. Some implementations disclosed herein can create an optical element (e.g., a diffraction grating) from plasma or ions, which can be less susceptible to damage from high intensity light as compared to solid-state optical materials. In various implementations, for example, two pump laser beams can be directed so that they intersect or overlap in a medium (e.g., a nonlinear medium). This nonlinear medium may have an index of refraction that varies with the intensity of light incident thereon, for example, when such intensities are sufficiently high. The nonlinear medium may comprise, for example, gas that may in some cases be ionized. Accordingly, in various implementations, the pump beams may be directed into gas, or a gas stream, or a gas jet. The term gas jet can refer to the gas itself, which can be a stream of gas, which can be emitted from a nozzle or other device. The two pump laser beams can optically interfere with each other, and can produce an interference pattern in the nonlinear medium such as in the gas. The interference pattern can alter an optical characteristic of medium, such as the index of refraction, which can produce a diffraction grating that corresponds to the interference pattern (e.g., in shape, size, grating spacing, etc.)

Without subscribing to any particular scientific theory, in some cases, for example, the interference pattern can produce spatially variant ionization (SVI) in the medium (e.g., gas), with areas of constructive interference having more plasma (e.g., less neutral gas) and with areas of destructive interference having less plasma (e.g., more neutral gas). The ionized gas of the plasma can have a lower index of refraction than the non-ionized gas (e.g., neutral gas), so that the interference pattern can produce variability in the index of refraction in the medium. Spatially controlled ionization can be used, where the highest-intensity regions of the interference pattern are above the ionization threshold of the medium while lower-intensity regions of the interference pattern are below the ionization threshold, thereby producing, in some cases, an alternating pattern of plasma and neutral gas.

Figure 2:
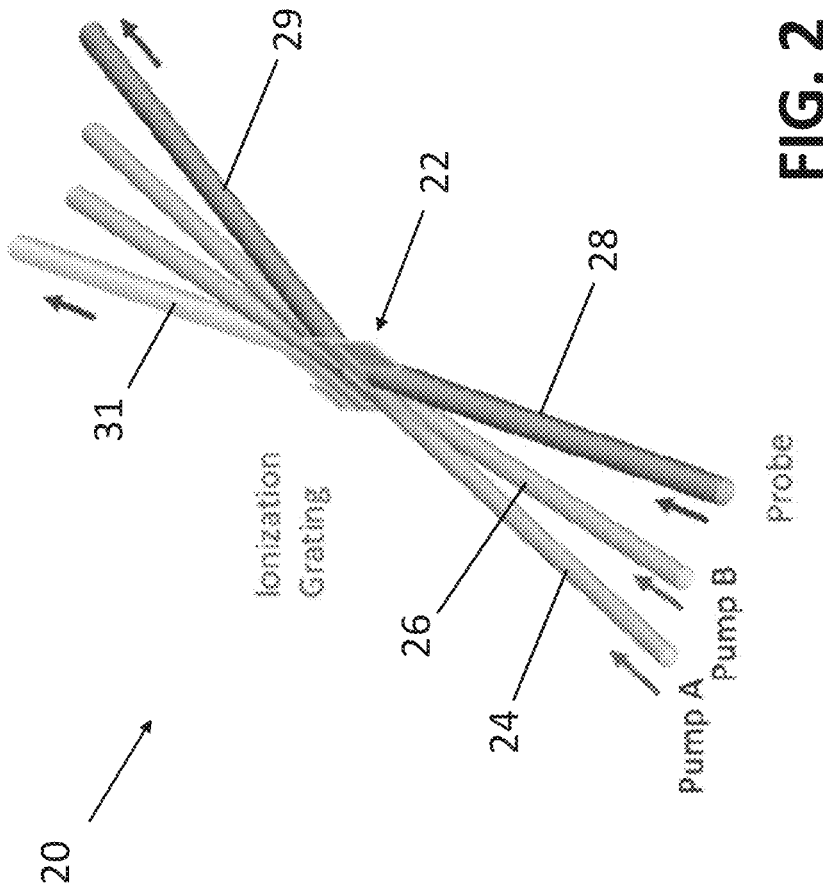
FIG. 2 is a schematic perspective view of example configuration for producing an ionization grating comprising first and second laser beams interfering so as to form an interference pattern in a medium.
Figure 3:
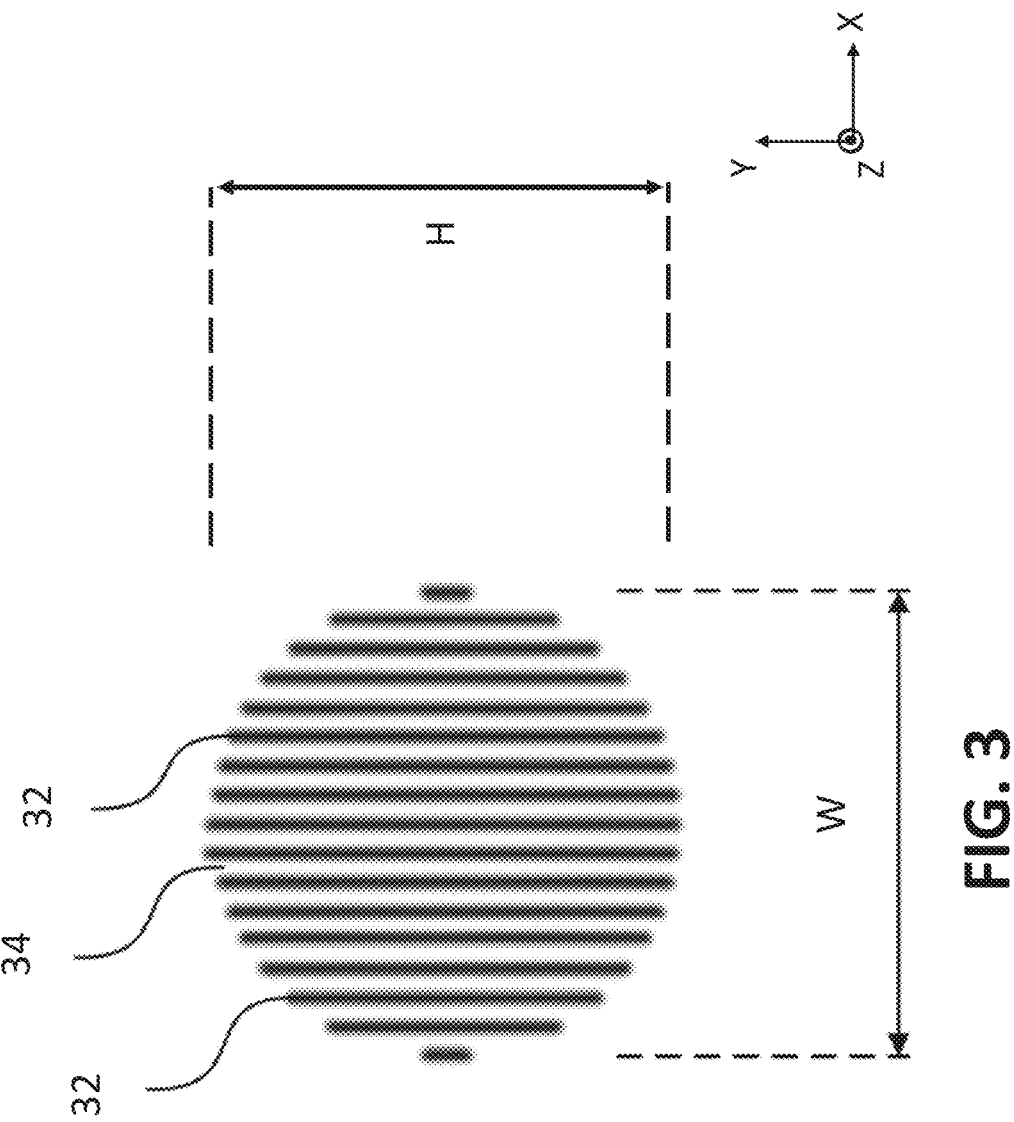
FIG. 3 is a schematic cross-sectional view of the interference pattern comprising a plurality of bright fringes separated by dark fringes formed by the first and second beams.
Figure 3:
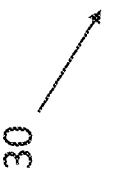

As illustrated in FIG. 2, a volumetric transmission grating 22 can be created in a neutral gas by crossing and optical interfering two-short-pulse pump laser beams 24, 26 (e.g., first and second laser beams). FIG. 2 shows a system configuration 20 comprising two-pump laser beams interfering at a medium to form a transient diffraction grating and a probe laser beam incident on and diffracted by the transient diffraction grating when the transient diffraction grating is activated. As shown, optically interfering the beams 24, 26 will produce an interference pattern or a fringe pattern 30, such as shown in FIG. 3, comprising bright fringes 32 of relatively high light intensity separated by dark fringes 34 having negligible optical intensity. The fringes 32, 34 depicted in FIG. 3 are linear. Such a fringe pattern 30 may be produced if the two laser beams 24, 26 are each collimated beams having planar wavefronts at least at the location where the beams intersect and the beams are angled with respect to each other such that the planar wavefronts in the first laser beam 24 are tilted with respect to the planar wavefront in the second laser beam 26. The beams 24, 26 are also caused to overlap and interfere within a spatial volume where the gas is located.

In various designs, the laser beams 24, 26 have sufficiently high intensity so that the intensity maxima of the bright fringes 32 reach and/or exceed the gas's ionization threshold thereby causing regions of the gas to be at least partially ionized. Conversely, the dark fringes 34 have sufficiently weak, possibly negligible, optical intensity such that the gas is not ionized or at least less gas is ionized. These alternating regions of bright and dark 32, 34, formed by constructive and destructive interference, respectively, will thereby create a modulated index of refraction across the gas as regions 32 having higher amounts of ionized gas will have a different (e.g., lower) refractive index than regions 34 having lower amounts of (if any) ionized gas. Plasma (e.g., ionized gas) can have an index less than 1. Non-ionized gas can has an index greater than 1. The difference between 1 and the index of a plasma (absolute value) is larger than for a neutral gas, so the neutral gas contribution can often be neglected for plasma or ionization gratings. This pattern 30 formed by alternative regions 32, 34 of low and high refractive index can diffract a subsequent laser beam 28 incident thereon as illustrated in FIG. 2 like a transmission grating. Accordingly, these structures 22 are referred to as ionization gratings. The ionization grating 22 is shown in FIG. 2 receiving a third laser beam 28, in addition to the first and second laser beams 24, 26, that interferes in the gas to form the diffraction grating 22. The ionization grating 22 diffracts the incident beam 28 producing the diffracted beam 29. The diffracted beam 29 is redirected by the ionization grating 22 in a different direction than the laser beam 28 incident thereon.

Likewise, the diffracted probe beam 29 travels in a different direction than the incident beam 28, which is beneficial for the application of contrast cleaning as the peak can be readily separated from the laser emission just prior to the peak. Another favorable trait is that the activation or turn-on time for the ionization grating is extremely fast. For example, when driven by pump beams 24, 26 comprising 30 femtosecond (fs) Full Width Half Maximum (FWHM) wide laser pulses, the diffraction efficiency of the ionization grating rises from unmeasurable or negligible to a maximum in less than a picosecond in various implementations. If the laser pulses in the probe beam 28 and the pump pulses in the first and second pump beams 24, 26 are timed appropriately, therefore, the formation of the ionization grating 22 can act like an optical switch, diffracting and changing the direction that a beam propagates in less than a picosecond, separating the peak from the pre-pulses and other laser emission preceding the peak.

As illustrated in FIG. 2, in various implementations, the first and second pump beams 24, 26 are incident on the medium, e.g., gas, at different angles. Accordingly, in various implementations, the first and second pump beams 24, 26 are not collinear or parallel to each other. In various implementations, however, the first and second pump beams 24, 26 are positioned and directed so that the beams overlap on the medium, e.g., the gas, such that an optical interference pattern is formed on and/or in the medium, e.g., the gas.

The medium used may be gas as described above or may be liquid in some cases. In various implementation, the medium comprises matter that changes with application of light such is high intensity laser light. For example, the medium may comprise atoms or molecules that ionize when exposed to sufficiently high intensity laser light. As such, ionization of the gas can occur in the bright region where bright fringes 32 are located while reduced or negligible ionization occurs in the dark regions where dark fringes 34 are located.

To improve the temporal contrast of the laser pulses, for example, which may already have been compressed using pulse compression techniques, the ionization grating 22 operates as an optical switch, turning on when the peak of the pulse passed through the grating such that the peak of the pulse is diffracted in a different direction than, for example, pre-pulses and other emission from the laser that precedes the peak of the pulse. For example, the timing of the pulses in the first and second (pump) beams and the third (probe) beam may be adjusted such that the pulses of the first and second (pump) laser beams 24, 26 converge onto the medium inducing formation of the ionization grating by ionizing the gas in the regions corresponding to the bright fringes at the same time that the peak of the laser pulse in the third beam is incident on the grating. The ionization grating is thus effectively turned on or activated just when peak of the pules in the third (probe) beam is at the location of the ionization grating. The peak is thus diffracted. In contrast, in some designs, the timing of the pulses in the first and second (pump) beams and the third (probe) beam may be adjusted such that the pulses of the first and second laser beams 24, 26 converge on the medium inducing formation of the ionization grating after the pre-pulses and other laser radiation preceding the peak have passed through the medium (e.g., the gas). The pre-pulses as well as the other radiation preceding the peak are thus not diffracted. Likewise, the peak can be separated from energy in the pre-pulses and other laser radiation preceding the peak. Likewise, if the diffracted beam 29 is directed toward a target, the target will primarily receive the peaks of the pulse while the pre-pulses and other light preceding the pulse may be attenuated. The target would thereby receive optical pulses having a high temporal contrast.

To cause the peak pulse to be diffracted but not the preceding laser radiation, the onset of the ionization grating 22 is delayed with respect to the incoming laser pulse in the probe beam 28. The activation of the ionization grating 22 can be delayed by delaying the pulses in the first and second (pump) beams 24, 26 which form the ionization grating 22 with respect to the pulse in the third (probe) beam 28. As will be discussed below, this delay in the arrival of the pump pulses 24, 26 can potentially be achieved by increasing the length of the optical path traveled by the first and second (pump) beams to reach the gas in comparison to the length of the optical path traveled by the third (probe) beam 28 to reach the gas. With the resultant short delay, e.g., 1 ps or less, in the initiation of the ionization grating 22, the main peak of the probe pulse arrives and diffracts from the ionization grating 22 while pre-pulses will already have passed through the non-ionized gas before the pump pulses arrive to active the ionization grating; thus, the pre-pulses will not be diffracted. In theory, the main peak will be diffracted while pre-pulses and other laser emission preceding the main peak will not be diffracted. The diffracted main peak of the probe should therefore be the first light arriving at the downstream target in various implementation.

Figure 4:
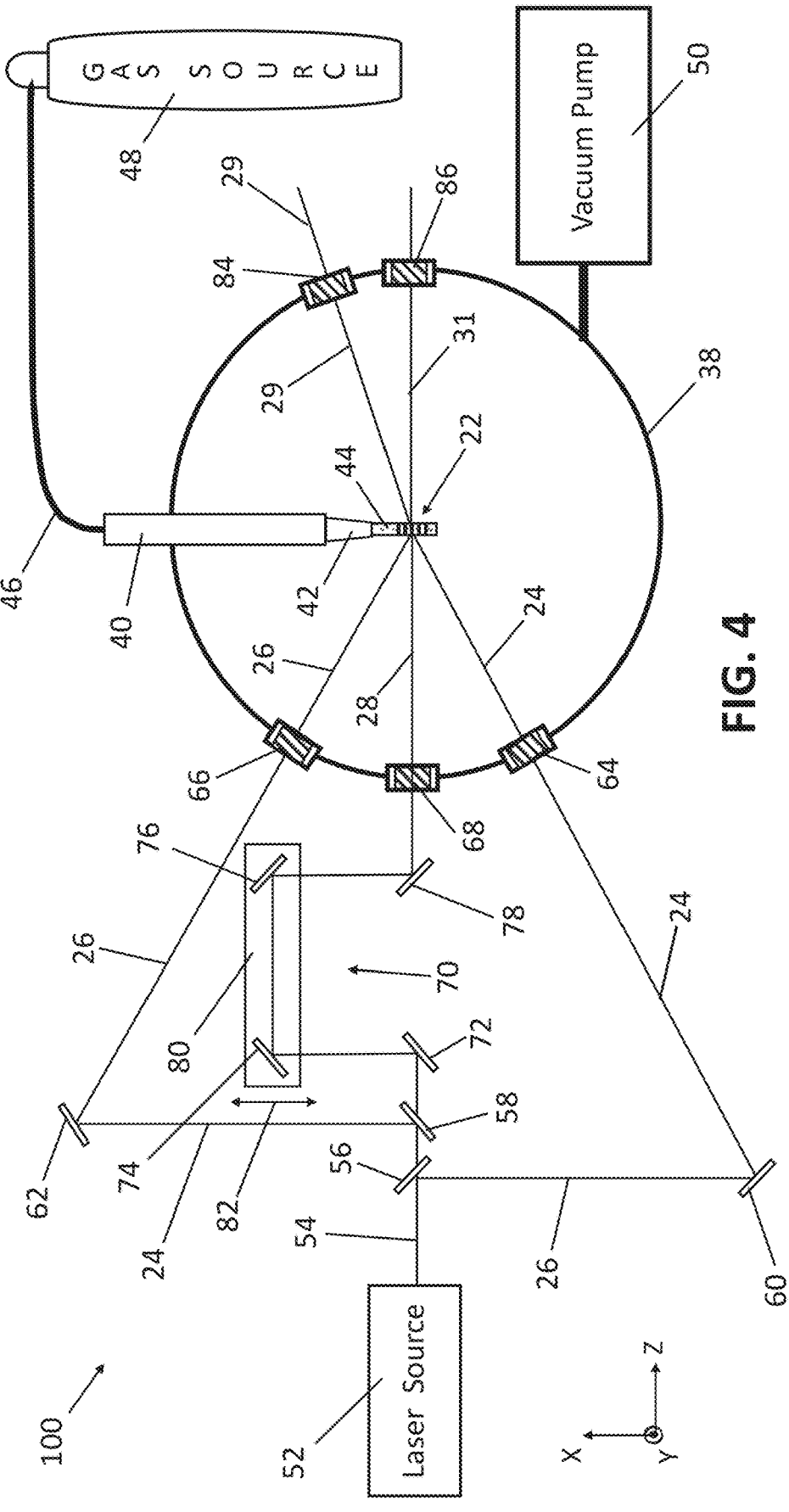
FIG. 4 is a schematic view of an example laser system for producing laser pulses having a reduced temporal contrast. The laser system comprises a laser and optics comprising a plurality of beamsplitters and mirrors that split a beam exiting the laser into first and second laser beams that interfere to produce an interference pattern on a medium comprising, for example, a gas jet ejected from a nozzle of a gas line within a vacuum chamber. An ionization grating is formed by the interference pattern, with bright fringes containing sufficient optical power to ionize the gas while dark fringes therebetween primarily comprise neutral gas having a different refractive index than the ionized gas. The separate regions form a diffraction grating. The beamsplitters are configured such that a third light beam produced by a portion of the laser beam emitted by the laser is incident on and diffracted by the diffraction grating.

FIG. 4 shows an implementation of a laser system 100 where the medium in which the interference pattern is formed comprises gas. A gas jet 36 provides neutral gas that is ionized by laser light within the bright fringes 32 of an interference pattern as describe above to form the ionization grating 22. The ionization grating 22 is formed in a vacuum chamber 38, which has a feedthrough 40 therein for providing gas via a nozzle 42 to produce a gas jet 44. In the example shown in FIG. 4, this feedthrough is a conduit for providing gas. The feedthrough 40 is coupled to a gas line 46 that is connect to a gas canister 48. The vacuum chamber 38 may be in communication with a vacuum pump 50 to reduce the pressure within the chamber. Other configurations are possible, for example, the gas may be provided in other manners or alternatively, the medium may comprise liquid. In some implementations, the medium comprises gas in a gas cell or liquid in a liquid cell. Still other variations are possible.

In various implementations, the ionization grating or plasma grating has a thickness of from 10 micrometers (μm) to 10 millimeters (mm). The ionization grating or plasma grating can also have a lateral spatial extent such as a height, H, width, W, and/or radius, R, of from 10 μm to 10 cm or 100 μm to 1 mm. Likewise, the gas, e.g., gas jet, may extend across a region having a height, H, width, W, and/or radius, R, of from 100 μm to 10 cm or 1 mm to 10 mm. In various implementations, the gas, e.g., gas jet, may have a thickness of from 10 μm to 10 mm. Similarly, the inner region of a gas or liquid cell where the gas or liquid is confined, e.g., between one or more optically transmissive or transparent windows, and/or the ionization or plasma grating formed therein, may have similar dimensions.

As discussed, the ionization grating 22 is formed in the medium 44, e.g., gas or liquid, by spatially overlapping the first and second (pump) beams 24, 26 at the medium such as shown in FIG. 4. The first and second (pump) beams 24, 26 are produced by a laser 52 that outputs laser light in the form of a beam 54 which is directed through first and second beamsplitters 56, 58 to generate the first and second (pump) beams, respectively, that are interfered to form the ionization grating 22. In the design shown in FIG. 4, the first (pump) beam 24 is directed toward the medium 44 at an angle by a mirror or reflector 60. Likewise, the second (pump) beam 26 is directed toward the medium 44 at an angle by a mirror or reflector 62. Additionally, in this design, the vacuum chamber 38 includes a first window 64 therein in the optical path of said this first (pump) beam 24 such that said first (pump) beam passes through this first window into the vacuum chamber and to the medium 44. Similarly, the vacuum chamber 38 includes a second window 66 therein in the optical path of the second (pump) beam 26 such that the second (pump) beam passes through this second window 66 into said vacuum chamber and to the medium 44.

In the configuration shown, light from the laser beam 54 output by the laser 52 that remains after the first and second (pump) beams 24, 26 have been extracted forms and/or contributes to the formation of the third (probe) beam 28. For example, in the design shown, light transmitted through the first and second beamsplitters 56, 58 forms the third (probe) beam 28 that continues onto the medium 44 and the ionization gating 22 formed by the interference of the first and second (pump) beams 24, 26. Additionally, in this design, the vacuum chamber 38 includes a third window 68 therein in the optical path of the third (probe) beam 28 such that the third (probe) beam passes through this third window into the vacuum chamber and to the medium 44. As illustrated, the first and second (pump) beams 24, 26 as well as the third (probe) beam 28 converge on and/or are incident on the medium 44, the first and second (pump) beams 24, 26 forming the ionization grating 22 in the medium 44, and the third (probe) beam 28 diffracting from the ionization grating formed in the medium. These beams 24, 26, 28 are thus positioned and directed to overlap on and/or in the medium 44.

As discussed above, the timing of the pulses in the first and second (pump) beams and the third (probe) beam 24, 26, 28 may be adjusted such that the pulses of the first and second laser beams converge on the medium 44 inducing formation of the ionization grating 22 after the pre-pulses and other laser radiation preceding the peak have passed through the medium (e.g., the gas). Accordingly, in various implementations, the optical path lengths traversed by the first and second (pump) beams 24, 26 are such that the laser pulse in the first and second (pump) beams, respectively, arrive at the medium 44 at the same time such that these pulses from the first and second beams interfere to form the ionization grating 22. Additionally, the optical path length traversed by the third (probe) beam 28 is such that the laser pulse in the third beam arrives at the medium 44 slightly before the pulses of the first and second (pump) beams 24, 26, which initiate the formation of the ionization grating 22. For example, the optical path length traversed by the third (probe) beam 28 may be such that pre-pulse(s) and other laser emission preceding the peak of the laser pulse in the third beam arrive at the medium 44 slightly before the pulses of the first and second (pump) beams 24, 26, which initiate the formation of the ionization grating 22, so that the pre-pulse(s) and/or the other laser emission preceding the peak in the laser pulse are not diffracted or less of the light is diffracted. This arrangement will allow for light of the pre-pulse(s) and/or other light preceding the peak of the laser pulse in the third (probe) beam 28 to be separated from the light comprising the peak of the laser pulse of the third beam, which is diffracted by the ionization grating 22, thereby increasing temporal contrast of the diffracted beam 31.

Accordingly, in various implementations, the optical path length traversed by the first and second (pump) beam 24, 26 are the same such that an optical pulse in the laser beam 54 output by the laser 52 is split by the two beamsplitters 56, 58 into respective optical pulses for the first and second (pumps) beams 24, 26 that overlap in time when these two optical pulses reach the medium (e.g., the gas) 44 and interfere with each other.

Additionally, to provide that the pulse in the third laser beam 28 is shifted in time, e.g., delayed, with respect to the arrival of the pulses from the first and second (pump) laser beams at the medium 44, the optical path length of the optical paths of the first and second laser beams 24, 26 to the medium can be larger or longer than the optical path length of the third laser beams to the medium. FIG. 4 shows such a configuration where the optical path length of the optical path for the third laser beam 28 to the medium 44 is smaller or shorter than the optical path length of the optical path to the medium for the first and second laser beams 24, 26.

In the implementation shown in FIG. 4, the optical path for the third (probe) laser beam 28 to the medium 44 additionally includes an adjustable optical delay 70 configured to tune the optical path length for the third laser beam 28; for example, the optical pulse for the third laser beam is delayed with respect to the onset of the ionization grating 22 produced by the coincident pulses from the first and second (pump) laser beam 24, 26 on the medium 44. This adjustable optical delay 70, for example, may be adjusted such that when the one or more pre-pulse(s) or other light preceding the peak, such as the elevated intensity plateau, reaches the medium 44, the ionization grating 22 is off or not activated such that this light is not diffracted; however, the optical peak of the optical pulse in the third laser beam 28 reaches the medium 44 when the ionization grating has been turned on. In the example shown in FIG. 4, the adjustable delay 70 comprises a series of mirror or reflectors 72, 74, 76, 78 that provide additional optical path length to the optical path of the third laser beam 28. In the design shown, however, some of the mirrors 74, 76 are mounted on one or more translations stages 80 that can be moved (for example, in the direction 82 shown) to change the optical path length. This translation stage 80 may possibly be moved manually by rotation of a screw or micrometer with the user's hand or may be electrically operated (e.g., may comprise an electrical motor or other type of actuator that introduces motion). Accordingly, the translation stage 80 may be adjusted such that the laser pulse in the third (probe) laser beam arrives at the medium 44 at the appropriate time with respect to the onset of the ionization grating 22 and/or the arrival of the laser pulses in the first and second (pump) laser beams 24, 28. As discussed above, similar types of adjustable optical delays can be included in the optical path(es) for either or both the first and second (pump) laser beams 24, 26. For example, an adjustable optical delay 70 can be included in the optical path of the first (pump) laser beam 24 to the medium 22 and adjusted such that the optical paths of both the first and second (pump) beams 24, 26 to the medium are the same. In some configurations, adjustable optical delays can be included in the optical paths for both the first and second (pump) laser beams 24, 26. In the later case, in some implementations, the adjustable optical delay 70 is not included in the optical path of the third laser beam 28 and the other adjustable optical delays in the optical paths of the first and second laser beams 24. 26, respectively, are adjusted such that the ionization grating 22 is activated prior to the main peak of the laser pulse in the third laser beam reaching the ionization grating. Other configurations and arrangements as well as other types of adjustable delays may be also employed.

FIG. 4 additionally shows the diffracted beam 29 propagating from the ionization grating 44. As discussed above, the third optical beam 26 is diffracted by the ionization or plasma grating 22 producing a diffracted laser beam 29 that is diffracted at an angle with respect to the direction of third laser beam 28 incident on the ionization grating and/or the portion of the third laser beam that is not diffracted (e.g., the zeroth diffractive order) 31. FIG. 4 shows the diffracted beam 29 propagating through a window 84 in the vacuum chamber 38 to outside the vacuum chamber. This diffracted beam 29 may progress onto a target such as, for example, a thin (e.g., nanometer range) metal foil, or solid metal surfaces, solid glass or other material, liquid jets or sheets, gas jets or cells. In various implementations, this output laser pulse in the diffracted laser beam 29 has increased temporal contrast. As discussed, in various implementations, the pre-pulses and/or the longer duration intensity plateau prior to the peak may be attenuated with respect to the peak of the pulse. FIG. 4 also shows the un-diffracted laser beam 31. This un-diffracted laser beam 31 passes through a window 86 in the vacuum chamber 38 to outside the vacuum chamber.

To operate the system 100, a user may manually adjust the adjustable optical delay 70 to increase the temporal contrast (as compared to being automatically adjusted by control electronics as discussed below). The user may, for example, evaluate the relative intensities of the peak of the laser pulse such as in pulses in the diffracted beam 31 and the light that precedes the peak such as pre-pulses and/or a longer duration intensity plateau and alter the adjustable optical delay 70 (possibly by rotating a screw or micrometer by hand or by activating motors to move the translation stage 80 on which optics such as mirrors 74, 76 are situated) in a manner to reduce the light preceding the peak (e.g., pre-pulses and/or a longer duration intensity plateau) with respect to the peak thereby increasing the temporal contrast. The temporal contrast can be monitored, for example, using third-order cross-correlation, scanning a delay and using multiple pulses to build up the measurement. A third-order cross-correlator from, Amplitude Systemes, Bordeaux, France, for example, be employed. When the pre-pulse(s) are separate by more time, such as more than a nanosecond, from the main peak, a fast diode may be suitable.

Figure 5:
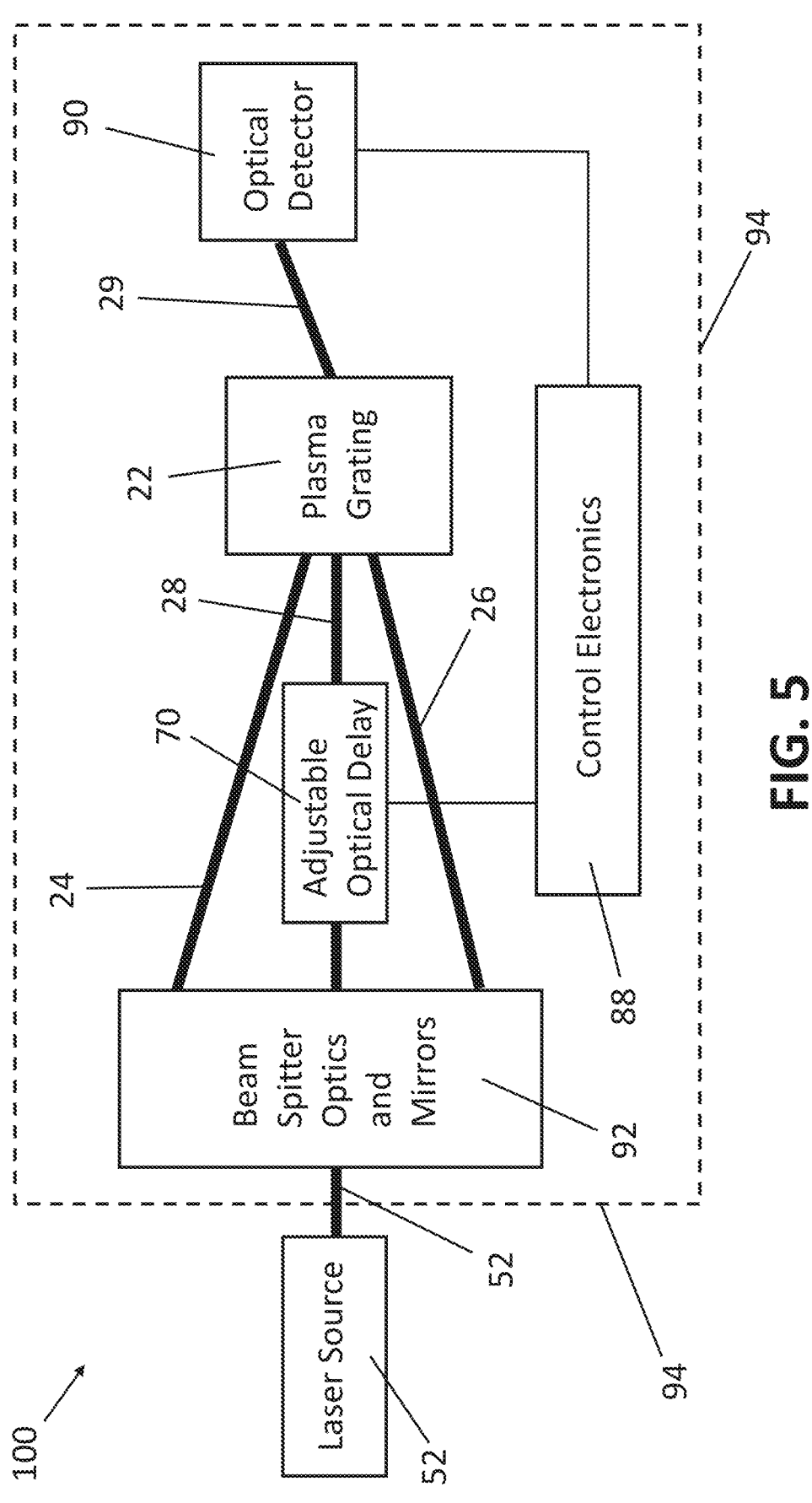
FIG. 5 is a block diagram that schematically depicts an example laser system comprising a laser and a plasma grating formed by first and second laser beams. These first and second laser beams are produced using a portion of the laser beam emitted by the laser that is directed through a plurality of beamsplitter and mirrors. A third laser beam also produced by a portion of the light from the laser beam emitted by the laser is incident on and diffracted by the plasma grating.

FIG. 5 shows a configuration that provides more automated adjustment of the optical delay to increase temporal contrast. FIG. 5 is a block diagram that schematically illustrates a laser system 100 for providing laser pulses with enhanced temporal contrast. As discussed above, the laser 52 is shown outputting a laser beam 54 to beamsplitting optics and mirror(s) 92 that split the beam into first and second laser beams 24, 26 that are positioned, oriented, and directed at the appropriate angle and location so as to overlap on the medium 44 interfering and forming the ionization grating 22. The third optical beam 28, derived from the laser beam 54 output from the laser 52, is shown emanating from the beamsplitting optics/mirrors module 92 and incident on the plasma (e.g., ionization) grating 22 after passing through the adjustable delay optics 70. As discussed above, the third optical beam 28 is diffracted by the plasma (or ionization) grating 22 producing a diffracted laser beam 29 that is diffracted at an angle with respect to the direction of third laser beam incident on the plasma (or ionization) grating. As discussed above, e.g., with regard to FIG. 4, the beamsplitting optics and mirror module 92 comprises optical elements such as beamsplitters, mirrors, reflectors, or other optical elements that split the laser beam 54 into one or more other laser beams 24, 26 and position and direct the various laser beams at the appropriate angle ultimately to reach the medium 44. A wide variety of configurations and arrangements of optical element forming the beamsplitting optics and mirror module 92 are possible FIG. 5 shows the diffracted beam 29 incident on an optical detector 90 that is electrically connected to control electronics 88 configured to evaluate the temporal contrast of the output pulses in the diffracted beam. This optical detector 90 may comprise, for example, a cross-correlator or possibly a diode, although other devices configured to map or image the temporal profile of the pulse can be employed. The control electronics 88 may be configured to assess the temporal contrast and/or to determine whether the temporal contrast has decreased and/or increased. In some implementations, a cross-correlator may be employed. A correlation measurement may be employed using a cross-correlator such as the Sequoia cross-correlator from Amplitude Systemes, Bordeaux, France. A cross-correlator may comprise a configuration of beamsplitters, doubling crystals, and delay lines, with the optical signal ultimately converted to an electrical signal by a photomultiplier tube. The beam to be measured is split in two, and the strength of some nonlinear signal as a function of the delay between the two component pulses is measured. The strength of the pulse at different times can be extracted from this measurement of the product of the two different portions of the pulse. A fast diode could also be used to image the pulse, for example, if the pre-pulse is 5 nanoseconds before the main pulse and was 1% of the energy thereof. The main pulse and pre-pulse could possibly be seen by the diode, possibly with less time resolution and/or dynamic range than an cross-correlator. The cross-correlator can have higher time resolution (and/or dynamic range) to resolve features such as peaks separated by a shorter time (e.g., a pre-pulse that arrives only 100 ps before with 0.001% of the energy of the main peak). The control electronics 88 is also shown electrically connected to the adjustable optical delay 70 and may adjust the optical delay, based on feedback from the optical detector 90 (e.g., cross correlator or diode), for example, to further increase the optical contrast. In some implementations, the control electronics 88 may, for example, send a signal to the translation stage 80 to increases or decrease the optical path length of the optical path of the third laser beam 28 to the plasma or ionization grating 22 to alter, and possibly increase, the temporal contrast.

The control electronics 88 may, for example, sample the peak of the pulse, possibly to determine the strength of the peak. The control electronics 88 may additionally or alternatively sample the intensity of the light preceding the peak of the pulse, such as pre-pulses and/or the elevated intensity plateau prior to the peak. The control electronics 88, based on sampling the peak and/or the light preceding the peak, may determine whether to adjust the adjustable optical delay 70. The control electronics 88 may, for example, compare the strength of the laser light preceding the peak, such as pre-pulses and/or the elevated longer duration intensity plateau or pedestal, with the strength of the peak, to assess the temporal contrast and determine whether and possibly how to alter the optical delay (e.g., to increase or decrease the optical delay) or not to alter the optical delay. As discussed above, the control electronics 88 may send a signal to the adjustable optical delay 70 to alter the optical delay, e.g., provided to the third laser beam 28. Also, as discussed above, in other configurations an adjustable optical delay 70 can alternatively or additionally be included in the optical path(s) of the first and/or second laser beams 24, 26. Likewise, the control electronics 88 may be in electrical communication with such adjustable optical delay(s) 70 to alter the optical delay, possibly in response to signals from the optical detector 90 and/or an assessment of the pulses in the diffracted beam 29 (e.g., the temporal contrast of the pulses). Accordingly, the control electronics 88 can monitor the pulses via an optical detection system 90 and the control electronics can control the adjustable optical delay 70, for example, to increase the temporal contrast. Other approaches are possible.

In some implementations, the control electronics 88 can include a processor, which can be configured to execute instructions, which can be stored in memory, to implement features disclosed herein, although any suitable configuration for the control electronics can be used including analog or digital electronic, FPGAs, etc.

FIG. 4 also includes a box 94 surrounding a portion of the system that receives the laser beam 54 output by the laser 52. This optical system or subsystem 94 can be optically connected to one or more different lasers to increase the temporal contrast of the laser(s) providing optical pulses thereto. Such a system 94 can potentially be used for different lasers 52, with the adjustable optical delay 80 being adjusted to accommodate different lasers and/or temporal pulse profiles (e.g., intensity v. time profiles). In some implementations, such a system 94 may have an optical input for receiving the laser beam 54 from the laser 52. In some implementations, the system 94 may include multiple inputs for receiving any number of multiple 24, 26, 28 beams. In some implementations, the input received comprises compressed laser pulses and this subassembly 94 may be optically connected to an optical compressor, which may be disposed in an optical path between the laser and this subassembly for decreasing or improving temporal contrast. Other configurations are possible.

Advantageously, various systems disclosed herein are expected to be applicable to high power laser beams and pulses. As discussed herein, a diffraction grating can be created from plasma, which can be less susceptible to damage from high intensity light as compared to solid-state optical materials. Plasma gratings and ionization gratings can operate at high intensity (above the damage threshold of solid-state optics) and are suitable for high-power laser systems such as TeraWatt to PetaWatt (TW-PW) laser system. For example, various systems and method described herein can be used with laser beams such as the input beam 54, the probe beam or third beam 28 incident on the plasma or ionization grating, the diffracted beam 29, or any combination of these, which may have a power, such as a peak power, from $1 \times 10^6$ to $1 \times 10^{18}$ Watts (W), from $1 \times 10^6$ to $1 \times 10^9$ W, from $1 \times 10^9$ to $1 \times 10^{12}$ W, from $1 \times 10^{12}$ to $1 \times 10^{15}$ W, from $1 \times 10^{15}$ to $1 \times 10^{18}$ W or any range between any of these values or possibly outside these ranges. Accordingly, the peak power of the pump and probe beams could be in the megawatt, gigawatt, terawatt, petawatt, or exawatt range or any combination of such ranges such as gigawatt to terawatt range. Moreover, the laser beam 54 may comprise pulses that have been compressed by a compressor.

Additionally, in various implementations, the efficiency of the system 100, which may comprise how much light (e.g., percentage) of the probe beam or third laser beam 28 is diffracted and thus coupled into the diffracted beam 29, may potentially be at least 10%, 20%, 30%, 40%, 50%, 60%, 70%, 80%, 90%, 95%, 98%, 99%, 99.9%, 99.99%, 100% as well as any range between any of these values. Similarly, a fast turn on time of the ionization gating of 1 ps or less turn-on time may be possible. For example, the turn-on time may range from 100 ps or less, 10 ps or less, 1 ps or less, 100 femtoseconds (fs) or less, 10 femtosecond (fs) or less, 5 fs or less, 1 fs or less, or any range between any of these values or possibly outside these ranges as well. Ponderomotive based plasma gratings may, for example, switch on from, e.g., from 900 ps to 90 ps or from 100 ps to 10 ps or any range between any of these values or outside these ranges. Ionization gratings may, for example switch on from, e.g., from 100 ps to 1 fs or from 10 ps to 1 fs or 10 ps to 5 fs or any range between any of these values or outside these ranges. Moreover, the contrast improvement may be at least $10^{10}$. The contrast improvement can be from $10^3$ to $10^{20}$ or $10^{18}$ or $10^{15}$ or $10^{12}$ or from $10^1$ or $10^2$ to $10^{10}$ or $10^{20}$ or any range between any of these values or possibly outside these ranges as well.

Figure 6:
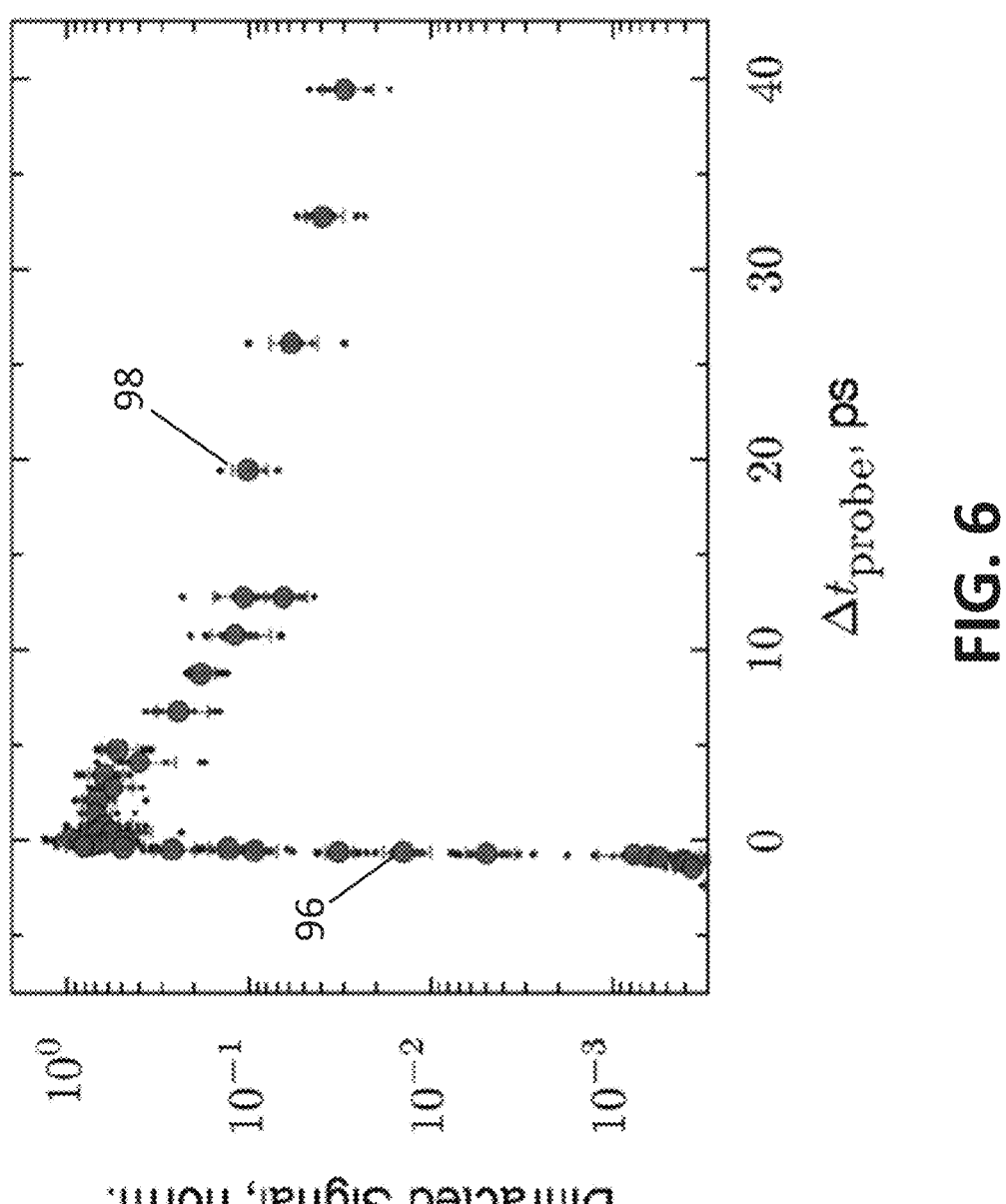
FIG. 6 is a plot of the diffraction efficiency of the ionization grating, on axes of diffracted signal (in arbitrary units) versus the difference in the arrival time of the pump pulses and the arrival time of the probe pulse (in picoseconds), demonstrating the rapid formation of the ionization grating using pulses from the first and second laser and the slower decline in diffraction efficiency with the passing of the laser pulses in the first and second laser beams through the gas.

More than 50% diffraction efficiency has been achieved and higher efficiencies are expected to be plausible. In preliminary measurements, a $10^3$ change of diffraction efficiency as the grating is switched on has also been measured. See, e.g., FIG. 6. FIG. 6 is a plot of the diffraction efficiency, on axes of diffracted signal (in arbitrary units) versus the difference in the arrival time of the pump pulses and the arrival time of the probe pulse (in picoseconds), of the ionization grating, demonstrating the rapid formation or onset 96 of the ionization grating using pulses from the first and second (pump) laser beams 24, 26 and the slower decline 98 in diffraction efficiency with the passing of the laser pulses in the first and second (pump) laser beams through the gas. When driven by pump beams 24, 26 comprising 30 fs wide (e.g., FWHM) laser pulses, diffraction efficiency rises from unmeasurable or negligible to a maximum in less than a picosecond, as shown by experimental measurements in FIG. 6. This result, however, was noise limited. The achievable contrast improvement is expected to be higher as the ionization process is extremely nonlinear, and the pump pulses are very short. Additionally, in theory, for an ionization grating 22, none of the probe light should travel along the diffracted beam path before the grating turns on. An efficiency improvement of $10^{10}$ or more may thus be plausible.

Additional Discussion of Plasma Gratings

As described above, in various implementations, two pump laser beams can be directed so that they intersect or overlap in a medium (e.g., a nonlinear medium). This nonlinear medium may have an index of refraction that varies with the intensity of light incident thereon, for example, when such intensities are sufficiently high. The nonlinear medium may comprise, for example, gas that may in some cases be ionized. Accordingly, in various implementations, the pump beams may be directed into gas, or a gas stream, or a gas jet. The term gas jet can refer to the gas itself, which can be a stream of gas, which can be emitted from a nozzle or other device. The two pump laser beams can optically interfere with each other, and can produce an interference pattern in the nonlinear medium such as in the gas. The interference pattern can alter an optical characteristic of medium, such as the index of refraction, which can produce a diffraction grating that corresponds to the interference pattern (e.g., in shape, size, grating spacing, etc.)

Without subscribing to any particular scientific theory, in some cases, for example, the interference pattern can produce spatially variant ionization (SVI) in the medium (e.g., gas), with areas of constructive interference having more plasma (e.g., less neutral gas) and with areas of destructive interference having less plasma (e.g., more neutral gas). The ionized gas of the plasma can have a lower index of refraction than the non-ionized gas (e.g., neutral gas), so that the interference pattern can produce variability in the index of refraction in the medium. Spatially controlled ionization can be used, where the highest-intensity regions of the interference pattern are above the ionization threshold of the medium while lower-intensity regions of the interference pattern are below the ionization threshold, thereby producing an alternating pattern of plasma and neutral gas. In some cases, the interference pattern can produce ponderomotively-forced plasma density fluctuations that create variations in the index of refraction in the nonlinear medium. For example, ions, as charged particles, can move based on the gradient in electric field created by the higher and lower intensity light in the interference pattern. In some implementations, the medium can have plasma at both the constructive and destructive interference portions of the interference pattern and ponderomotive ion forcing can produce different densities of plasma, and therefore different indices of refraction, at the constructive and destructive interference portions. Some designs can use ponderomotive electron forcing, where electrons (e.g., plasma electrons) are ponderomotively driven by the interference pattern but the timing is too short for significant ion motion, to produce different indices of refraction at the high and low intensity regions of the interference pattern. Some implementations disclosed herein can make or use a plasma grating, such as a plasma volume transmission grating. Any suitable mechanisms for producing interference pattern variations in the index of refraction within the nonlinear medium are possible, as well as suitable combinations thereof.

Any suitable medium can be used in which the index of refraction can vary depending on the intensity of light, so that the interference pattern between the two pump beams can modify the index of refraction across the medium. Additionally, a fast turn-on time will aid in separating the peak from the pre-peak laser emission. Also, as discussed herein, a nonlinear medium comprising a plasma may have the advantage of providing a higher damage threshold than other mediums. Having the ability to withstand high light intensity can thus make such plasma based optical elements, e.g., plasma gratings, useful for high power lasers and laser systems. For example, the plasma grating can be used to operate on laser pulses amplified by a laser pulse compressor or a chirped laser pulse amplification system that output high peak power laser pulses that could damage or destroy conventional solid-state optics.

As discussed above, FIGS. 4 and 5 shows example implementations of systems 100 having an optical element, such as a diffraction grating (e.g., such as a plasma volume transmission grating). The system 100 can include one or more lasers 52 configured to produce a first pump laser beam 24 and a second pump laser beam 26. The pump laser beams 24 and 26 can be directed to a medium 44, which can be a nonlinear medium. The medium 44 can be a gas, a plasma, a liquid, a solid, or any other suitable material that at can produce a change in the index of refraction that depends on the intensity of light. Examples of solid mediums include a thin solid foil that is ionized and expands to produce a lower density plasma. The solid may be held in position by a support such that the first and second laser beams can be incident thereon. The first pump laser beam 24 and the second pump laser beam 26 can be directed so that they intersect or overlap each other in the nonlinear medium 44, which can produce an interference pattern in the medium.

The interference pattern can produce a variable index of refraction in the medium 44, such as by producing a variable distribution of plasma, or any other suitable mode of operation, such as those described herein. A probe laser beam 28 can be directed to the medium 44 with the varying index of refraction to modify (e.g., to diffract and/or redirect) the probe laser beam 108. The system 100 can produce a modified (e.g., diffracted and/or redirected) probe laser beam 29 that exits the medium 44. In some implementations, a laser 52 or a chirped pulse amplification (CPA) system can provide the probe beam 28 that is incident on the medium 44.

In some embodiments, the one or more lasers 52 can be configured to produce laser pulses for the first pump laser beam 24, the second pump laser beam 26, and/or the probe beam 28. The one or more lasers 52 can include one or more femtosecond lasers or one or more picosecond lasers, although any suitable laser(s) can be used. The plasma grating 22 can be produced using femtosecond laser pulses, although picosecond laser pulses could be used, or laser pulses of any suitable duration. Although the variable index of refraction in the medium 44 (e.g., produced by the variable distribution of plasma) can be transient, it can persist long enough to produce an optical element (e.g., a diffraction grating) that can operate on the probe laser beam 28 or other light (e.g., so as to diffract the light). For example, a probe beam 28 can propagate through a transient diffraction grating formed in the medium 44 so that the light of the probe laser beam 28 is modified (e.g., diffracted and redirected), as discussed herein.

As discussed above, the system 100 can include one or more optical elements that can be configured to direct the laser beams 24 and 26 to the medium 44. In some implementations, one laser can be used to produce both the first pump laser beam 24 and the second pump laser beam 26, which can facilitate the delivery of both pump laser beams 24, 26 to the medium 44 at the same time, especially for short duration laser pulses. A laser beam (e.g., comprising laser pulse(s)) can be split (e.g., using one or more beam splitters) to produce the two pump laser beams 24, 26. Once split, the two pump laser beams 24, 26 can follow different paths with different optical element(s), which can redirect (e.g., reflect) one or both of the two pump laser beams 24, 26 so that they cross, intersect, and/or overlap at the medium 44 and optically interfere. The one or more optical elements for directing the laser beams 24, 26 can include one or more mirrors, reflector, lenses, beam splitters (e.g., beamsplitter plates, beamsplitter prisms), etc.

The same laser that makes either or both of the pump laser beams 24, 26 can also produce the probe laser beam 28, in some implementations. For example, the laser can be configured to produce lower intensity pulses for the pump beams 24, 26 and a higher intensity pulse for the probe beam 28. In other embodiments, a first laser can be used to make the pump laser beams 24, 26 and a second laser can be used to produce the probe laser beam 28, or two or three different lasers can be used to make the beams 24, 26, 28. For example, in some cases first and second lasers can be used to provide the first and second laser beams 24, 26, respectively. The first pump laser beam 24 and the second pump laser 26 can propagate directly from the respective first and second lasers to the medium 44. The beam directing optical elements can be omitted in some cases.

FIG. 4 shows an example design of a system 100 for producing an optical element, such as a plasma grating. The system 100 can have a vacuum chamber 38, which can be configured to maintain a partial or substantial vacuum inside the vacuum chamber. A gas such as a gas jet or gas stream can be used as the non-linear medium 44. The system can have a gas supply 40, 46, 48 that can be configured to provide the gas jet or stream. The system can have a vacuum pump 50, which can extract the gas from the vacuum chamber and/or potentially establish an internal pressure lower than atmospheric pressure. The inlet (e.g., gas supply 40) and the outlet (e.g., vacuum pump 50) for the gas medium 44 can be disposed on opposing sides of the vacuum chamber 38, or can face each other, to produce a finite gas jet or stream through the vacuum chamber. The gas jet can be a stream of gas flowing from the inlet (e.g., gas supply 40, 42) to the outlet (e.g., vacuum pump 50). The gas jet or stream can have a thickness, which can be defined for example by the sizes and/or positions of the inlet (e.g., nozzle 42) and possibly the outlet (e.g., vacuum pump 50) or other features of the system 100 or combination thereof. In some implementations, a target of the diffracted laser beam 29 can be inside the vacuum chamber 38, although in other implementations, the diffracted laser beam 29 can be output from the system 100. In some implementations, hydrogen or helium, or any other suitable gas can be used for the medium 44. Other materials, such as liquids or solids could be used for the medium 44. For example, a thin layer of a solid material (e.g., a foil) can be used as the medium 44. The solid material can have a thickness of about 0.0005 mm, about 0.00075 mm, about 0.001 mm, about 0.0025 mm, about 0.005 mm, about 0.0075 mm, about 0.01 mm, about 0.025 mm, about 0.05 mm, about 0.075 mm, about 0.1 mm, about 0.25 mm, or more, or any values or ranges between any combination of these values, although other thicknesses could be used in some cases. The solid medium 44 can be in a vacuum (e.g., inside the vacuum chamber 50) in some cases. The solid medium 44 may be held in position by a support.

The pump laser beams 24, 26 can ionize part of the solid medium, which can produce an expanding gas-density plasma, in some cases. The distribution of plasma can depend on the intensity of the light, so that the interference pattern between the pump beams 24, 26 can determine the distribution of the plasma. The system can include a support (e.g., a holder) configured to position the medium 44 (e.g., a plate or sheet or any suitable solid medium) relative to the one or more lasers 52 or laser beams so that the interference pattern can be formed at, on, and/or in the medium 44. The nonlinear medium 44 can be held in place by the support and the medium 44 may comprise a material (e.g., sheet, plate, foil, substrate, slab, etc.), which may be rigid or flexible and may be solid. The one or more lasers 52 and/or the optical element(s) can be disposed or otherwise configured with respect to the support to direct the laser beams onto the nonlinear medium 44 so as to form a suitable interference pattern at that location. The optics that can be used to direct the laser beams to the nonlinear medium 44 (or the location relative to the support or supply where the nonlinear medium would be provided) can include one or more mirrors, reflectors, lenses, beam splitters, beam combiners, or any other suitable optical components. In some implementations, the two pump beams comprise collimated beams incident at an angle with respect with each other to form an interference pattern corresponding to two tilted plane waves. Such an interference pattern, may comprise, for example, a plurality of parallel straight-line fringes. Suitable optics, such as lenses configured to provide collimation and/or mirrors to redirect the beam(s) may be employed, in some implementations to produce such beams. The system 100 can include a supply configured to provide the nonlinear medium 44. The supply can include a gas supply line, or a liquid supply line, a nozzle, or a flow cell (e.g., for transporting a liquid nonlinear medium 44), transparent conduits, or chambers for example with transparent windows, or any other suitable device. The supply or support can position or direct the medium 44 at or to the location where the interference pattern is formed. In some embodiments, a flow or stream of a liquid or gas can be formed between an inlet and an outlet, and the liquid or gas can be used as the nonlinear medium 44.

In some designs, the vacuum chamber 38 can be omitted. For example, the system 100 can operate in ambient air in some configurations. In some embodiments, the medium 44 can be a gas or other material with an ionization threshold that is lower than the ambient gas (e.g., air), so that the pump beams 24, 26 can ionize the medium 44 without ionizing other areas (e.g., air) in the system 100.

In some designs, the system can include a laser that can direct a fourth (e.g., heater) laser beam through an area to produce a region of material (e.g., air) with increased energy to supply the medium 44. In some embodiments, one or more optical elements (not shown) can modify the fourth laser beam to distribute the energy of the fourth laser beam across the area of the medium 44. This fourth laser beam can propagate substantially perpendicular to one or more of the first pump beam 24, the second pump beam 26, and/or the probe beam 28. The fourth laser beam can propagate substantially perpendicular to the area where the first and second pump laser beams 24 and 26 substantially entirely overlap. The fourth laser beam can propagate substantially perpendicular to a direction midway between the directions of propagation for the first pump laser beam 24 and the second pump laser beam 26. For example, one or more lenses or other optical elements (not shown) can spread or otherwise distribute the fourth laser beam to affect an area that can be similar in size to the stream of gas medium in other designs. In some configurations, the energy of the constructive interference between the first and second pump beams 24, 26 together with the energy from the fourth laser beam can be sufficient to ionize the material (e.g., air) in the area of the medium 44, whereas areas that do not receive the fourth laser beam do not ionize even when there is constructive interference between the pump beams 24, 26. In some implementations, ambient air that is exposed to the fourth laser beam can be the medium 44.

In some implementations, the pump laser beams 24 and 26 can pre-ionize the areas of constructive interference, such as by ionizing a small percentage (e.g., about 1% to 10%) of the air or other material. Then, the fourth laser beam can deliver energy to further ionize the pre-ionized areas (e.g., to increase plasma density), such as by collision ionization. The fourth laser beam can have insufficient power to not ionize regions that were not pre-ionized by the pump beams 24, 26 (e.g., areas of destructive interference and/or areas outside the laser beams 24 and 26). In some implementations, the fourth laser beam can be a longer pulse than the pump laser beams 24, 26. The pump beams 24, 26 can be delivered to the area at a first time, the fourth laser beam be delivered to the area at a second time that is after the first time (although some overlap is possible in some cases), and a probe beam can be delivered to the area at a third time that is after the second time (although some overlap is possible in some cases).

In some embodiments, the fourth laser 123 can pre-ionize an area, such as by ionizing a small percentage (e.g., about 1% to about 10%) of the air or other material. The pre-ionized area can act as the medium 44. Then the pump beams 24, 26 can further ionize the pre-ionized areas that correspond to constructive interference between the pump beams 24, 26 (e.g., to increase plasma density), such as by collision ionization. The areas of destructive interference may not have enough intensity to further ionize the material, in some designs. The third laser beam can be delivered to the area at a first time, the pump beams 24, 26 can be delivered to the area at a second time that is after the first time (although some overlap is possible in some cases), and a probe beam 28 can be delivered to the area at a third time that is after the second time (although some overlap is possible in some cases).

In some embodiments, the system 100 can include three pump laser beams. Two of the pump laser beams 24, 26 can interfere to produce an interference pattern, as discussed herein, and the third pump laser beam can apply supplemental energy so that the areas of constructive interference can ionize the gas (e.g., ambient air). In some cases, three laser beams 24, 26 can be delivered to the area at the same time, and the areas of constructive interference between beams 24 and 26, together with the additional energy of third laser beam, can have sufficient intensity to ionize the material, while the areas of destructive interference do not have sufficient intensity to ionize the material, even with the energy of the beam. The third laser beam can have a different wavelength than the beams 24, 26, which can impede static interference between the third beam and the first and second pump beams 24, 26. The intensity of the third beam can be lower than the intensity of the beams 24 and 26, which can reduce the interference effects that third beam may contribute to the resulting interference pattern. In some cases, the first and second pump laser beams 24, 26 can create pre-ionized regions (e.g., at locations of constructive interference), and the third pump laser beam (e.g., the heater beam) can ionize the pre-ionized regions (e.g., at a later time).

In some configurations, the size of the formed optical element (e.g., the plasma grating) can be limited to the area of interaction between the first and second pump laser beams 24, 26, and the third laser beam. In some implementations, control electronics can control the laser that provides the third laser beam as well as the one or more lasers 52 that produce the first and second pump laser beams 24 and 26, so as to control the timing of the first, second and third laser beams 24, 26. In some cases, the first and second pump laser beams 24, 26, and the third laser beam can be provided by a single laser. For example, optical elements can separate the 3 laser beams and redirect the first and second pump laser beams 24, 26, and/or the third laser beam so that they can provide the medium 44 and interference pattern, as discussed herein.

FIG. 4 shows an example of two pump beams 24, 26 producing an optical element 22 (e.g., a plasma grating) in a medium 44. The medium 44 can have a thickness D. In some implementations, the nozzle of the gas supply 40, 46, 48 can have an elongate shape that is shorter in the general direction of propagation of the laser beams 24, 26, and longer in the orthogonal direction although the shape may be different. In some implementations, multiple nozzles may be employed. In various implementations, the first pump laser beam 24 and the second pump laser beam 26 can be angled relative to each other. FIG. 4 shows an example of the first pump laser beam 24 and the second pump laser beam 26 intersecting at the medium 44. The medium can have a thickness of D (e.g., defined by the stream of gas, or nozzle, etc.) The first pump laser beam 44 and the second pump laser beam 46 can propagate in directions separated by an angle of $2\theta_p$. In various implementations, the first pump laser beam 44 can be angled in a first direction relative to a line normal to the medium 44 by an angle of $\theta_p$. The second pump laser beam 26 can be angled in a second direction (e.g., opposite the first direction) relative to a line normal to the medium 44 by an angle of $\theta_p$. The overlapping area of the first and second pump laser beams 24, 26 can increase as the laser beams 24, 26 approach the medium 44. The maximum overlap between the first and second pump laser beams 24, 26 can be inside the medium 44. In some implementations, the first and second beams 24, 26 can diverge as they propagate away from the medium 44.

The first and second pump laser beams 24, 26 can be substantially equal-power laser beams in some cases although their power and relative power may vary. The first and second pump beams 24, 26 can propagate in a substantial vacuum except for the region of the gas medium (e.g., gas jet) 44, which can have thickness D. The first and second pump laser beams 24, 26 can have substantially the same wavelength $\lambda_p$ (or wavelength range) in some implementations. The third (probe) laser beam 28 can have the same wavelength (or wavelength range) as the first and second pump beams 24, 26 in some embodiments, but a different wavelength can be used for the probe beam 28 in some cases as well. The first pump laser beam 24 and the second pump laser beam 26 can both be plane wave beams in various implementations. Accordingly, the first pump laser beam 24 and the second pump laser beam 26 can both be substantially collimated in some cases.

Where the first and second pump laser beams 24 and 26 cross and intersect the medium 44, they can create an interference pattern. The first and second pump beams 24, 26 can interfere everywhere that they overlap, but the interference pattern is recorded where the beams 24, 26 overlap in the medium 44. FIG. 3, discussed above, shows an example of an optical interference pattern created in the medium 44 by the two pump beams 24, 26. The interference pattern 30 can have regions of constructive interference 32 with high intensity light (e.g., possibly higher light intensity than either of the pump beams alone), and regions of destructive interference 34 with low intensity light (e.g., possibly lower light intensity than either of the pump beams). The interference pattern 30 can produce a series of high intensity lines and low intensity lines. In some implementations the lines of high and low intensity are arranged along a single direction. These lines may, for example, comprise straight lines as shown in FIG. 3 that are parallel to each other. Such an interference pattern 30 can be produced by interfering two plane waves and can be produced by to collimated beams directed at an angle with respect to each other. The direction of the elongate or linear fringes can be determined by the orientation of the planar wavefronts with respect to each other and hence the direction that the pump laser beams 24 and 26 are angled with respect each other. The elongate or straight line fringes may be directed in a direction orthogonal to the plane of incidence of the two beams, as can be seen in FIGS. 2 and 4. The number of fringes and their spacing can be determine by the amount of tilt between the planar waves or the angle, $2\theta_p$, between the two pump beams. The distance between bright lines or fringes (e.g., the grating period $\Lambda$, which can be referenced as the wavelength of the 1D intensity modulation) can be given by the equation $\Lambda=\lambda_p/2*\sin\theta_p$. Pump laser beams 24 and 26 that are directionally offset from each other along a horizontal axis can produce an interference pattern 30 on the medium 44 with interference lines or fringes that are directed along the vertical direction and extend periodically along the horizontal direction, as shown in FIGS. 2 and 4. Accordingly, the interference pattern 30 can produce a stack of lines or fringes. As discussed above, this plurality of lines or fringes can produce a similarly patterned variation of index of refraction can form a diffraction grating, e.g., a linear diffraction grating, that can diffract light.

The medium 44 can be configured to have a variable index of refraction that depends on the intensity of light, so that the interference pattern 30 can modify the indices of refraction at different regions in the medium 44. With reference to FIG. 3, in some implementations the regions of constructive interference 32 can have a lower index of refraction than the regions of destructive interference 34, for example. The modulated index of refraction can be produced by a number of different mechanisms and in a number of different manners.

In some embodiments, spatially variant ionization (SVI) or spatially controlled ionization can produce the variations in the index of refraction in the medium 44. The medium 44 and the pump beams 24, 26 can be configured so that more of the medium 44 is converted into plasma at the regions of constructive interference 32, and less (or none) of the medium is converted into plasma at the regions of destructive interference 34. For example, in some implementations, only regions of constructive interference between the two pump beams 24, 26 have at sufficient intensity to ionize the gas medium 44. Although the medium 44 is discussed as being a neutral (e.g., non-ionized) gas, any suitable medium material could be used. By way of example, in some implementations, the index of refraction of the neutral gas medium can be greater than one (n>1), and the index of refraction of the plasma (e.g., ionized gas medium) can be less than one (n<1). Thus, as more of the gas medium in a region is ionized and converted into plasma, the index of refraction of that region can be reduced. Also, the distribution of the plasma (e.g., ionized gas) in the gas medium 44 (non-ionized gas) may be driven by light intensity, which can affect the indices of refraction across the interference pattern. For SVI, in some cases, the magnitude of the induced change in the index of refraction $\Delta n$ can be about $10^{-2}$ or about 1%. By way example, the difference between the index of refraction of the regions of constructive interference 32 and the regions of destructive interference 34 can be about 0.3, about 0.2, about 0.175, about 0.15, about 0.125, about 0.1, about 0.075, about 0.05, about 0.04, about about 0.02, about 0.015, about 0.01, about 0.0075, about 0.005, about 0.004, about about 0.002, about 0.001, about 0.00075, about 0.0005, about 0.00025, about 0.0001, or less, or any values or ranges between any of these values, although other amounts of index change can be implemented. The changes to the index of refraction can last for tens to hundreds of picoseconds, even when produce by femtosecond pump laser pulses. The modulated index of refraction can persist for about 1 picosecond, about 2 picoseconds, about 5 picoseconds, about 10 picoseconds, about 15 picoseconds, about 20 picoseconds, about 30 picoseconds, about 40 picoseconds, about 50 picoseconds, about 75 picoseconds, about 100 picoseconds, about 125 picoseconds, about 150 picoseconds, about 175 picoseconds, about 200 picoseconds, about 250 picoseconds, about 300 picoseconds, about 350 picoseconds, about 400 picoseconds, about 450 picoseconds, about 500 picoseconds, about 600 picoseconds, about 700 picoseconds, about 800 picoseconds, about 900 picoseconds, or more, or any values or ranges between these values, although other duration times can be produced.

In some cases, the variations in the index of refraction can be produced by ponderomotively-forced plasma density fluctuations. The ponderomotive force can impose a nonlinear force on a charged particle in an inhomogeneous oscillating electromagnetic field, and the ponderomotive force can cause the particle to move towards the area of the weaker field strength. Thus, the ponderomotive force can produce plasma density variations, and accompanying variations in the index of refraction, even if the medium is full-ionized gas (e.g., if all of the regions of constructive interference and destructive interference are plasma). In some embodiments, the regions of destructive interference 34 can have higher plasma density than the regions of constructive interference 32 due to the ponderomotive force, which can in some cases produce a lower index of refraction for the regions of destructive interference 34, as compared to the regions of constructive interference 32 (e.g., since vacuum has an index of refraction of 1). For the ponderomotive force, the magnitude of the induced change in the index of refraction $\Delta n$ can be about $10^{-4}$. For example, the difference between the index of refraction of the regions of constructive interference 132 and the regions of destructive interference 134 can be about 0.4, about 0.3, about 0.2, about 0.1, about 0.075, about 0.05, about 0.025, about 0.01, about 0.0075, about 0.005, about 0.0025, about 0.001, about 0.00075, about 0.0005, about 0.0004, about 0.0003, about 0.0002, about 0.00015, about 0.0001, about 0.000075, about 0.00005, or less, or any values or ranges between any of these values, although other amounts of index change can be implemented. The changes to the index of refraction can last for tens of picoseconds. The modulated index of refraction can persist for about 1 picosecond, about 2 picoseconds, about 5 picoseconds, about 10 picoseconds, about 15 picoseconds, about 20 picoseconds, about 30 picoseconds, about 40 picoseconds, about 50 picoseconds, about 75 picoseconds, about 100 picoseconds, or more, or any values or ranges between these values, although other duration times can be produced. In some cases, the medium 44 can be a plasma even before the pump laser beams 24, 26 apply energy to the medium 44. In some cases, the medium and the pump laser beams 24, 26 can be configured so that the pump laser beams 24, 26 substantially fully ionize the medium. In some cases, ponderomotive electron forcing can drive electrons without (or before) moving the plasma ions, and the electron density variations can produce the differences in the indices of refraction.

The optical element (e.g., plasma grating) can persist after the end of the pump laser beams 24, 26 for a time that is longer than the pulses of the pump laser beams 24, 26, such as about 2 times longer, about 5 times longer, 10 times longer, about 25 times longer, about 50 times longer, about 75 times longer, about 100 times longer, about 150 times longer, about 250 times longer, about 500 times longer, about 750 times longer, about 1,000 times longer, times longer, about 1,250 times longer, about 1,500 times longer, about 1,750 times longer, about 2,000 times longer, about 2,500 times longer, about 3,000 times longer, about 4,000 times longer, about 5,000 times longer, about 7,500 times longer, about times longer, about 15,000 times longer, about 25,000 times longer, about 50,000 times longer, about 100,000 times longer, about 150,000 times longer, about 200,000 times longer, or more, or any values or ranges between any combination of these values, although other configurations are possible.

Moreover, in various implementations the optical element (e.g., plasma grating) can persist long enough after the end of the pump laser beams 24, 26 (e.g., after the pump laser beam pulse), that a laser pulse of the probe beam 28 can be delivered to the diffraction grating 22 in the medium 44 after the end of the pulses of the first and second pump laser beams 24, 26 by a delay time, which delay can be about 1 picosecond, about 5 picoseconds, about 10 picoseconds, about 25 picoseconds, about 50 picoseconds, about 75 picoseconds, about 100 picoseconds, about 150 picoseconds, about 200 picoseconds, about 250 picoseconds, about 300 picoseconds, about 350 picoseconds, about 400 picoseconds, about 450 picoseconds, about 500 picoseconds, about 600 picoseconds, about 700 picoseconds, about 800 picoseconds, about 900 picoseconds, about 1,000 picoseconds, or more, or any values or ranges between any combination of these values, although other configurations are possible. The probe beam 28 can be a femtosecond laser pulse or a picosecond laser pulse, although any suitable pulse duration can be used. In some implementations, the pulse of the probe beam 28 can be longer than the pulses of the pump beams 24, 26, such as about 2 times longer, about 5 times longer, 10 times longer, about 25 times longer, about 50 times longer, about 75 times longer, about 100 times longer, about 150 times longer, about 250 times longer, about 500 times longer, about 750 times longer, about 1,000 times longer, or more, or any values or ranges between any combination of these values, although other configurations are possible. In some implementations, the probe beam 28 can have a shorter duration than one or both of the pump beams 24, 26. For example, the pump beams 24, 26 can be 100 ns long in some cases, and the probe beam could be a 10 fs pulse. Various different interference patterns can be created by overlapping the first and second pump laser beams 24, 26 at the medium 44. As discussed above, in some implementations, an interference pattern comprising a linear fringe pattern comprising a plurality of straight line fringes can be formed by interfering two planar wavefronts such as by interfering two collimated pump beams 24, 26. Such an interference pattern will produce a diffraction grating having no or negligible optical power. In various implementations, the magnitude of optical power of the diffraction grating is less than $0.1 \text{ m}^{-1}$ or $0.05 \text{ m}^{-1}$ or $0.01 \text{ m}^{-1}$ or $0.0 \text{ m}^{-1}$ or any range between any of these values. For example, the magnitude of any optical power could be $0.1 \text{ m}^{-1}$ or less, e.g., from $-0.1 \text{ m}^{-1}$ to $0.1 \text{ m}^{-1}$. Other arrangements and other fringe patterns, however, are possible. For example, in certain implementations, the resultant diffractive optical element could have an optical power from $-100 \text{ m}^{-1}$ to $100 \text{ m}^{-1}$.

The plasma grating 22 can have a thickness D, which can be smaller than the height H of the grating 22 (e.g., plasma grating). In some cases, the height H of the plasma grating 22 can be defined by the diameter of the overlapping pump laser beams 24, 26. The pump laser beams 24, 26 can overlap each other by at least 75%, at least about 80%, at least about 85%, at least about 90%, at least about 95%, or about 100% or any range between any of the values at the medium 44 although the overlap can possibly be smaller. The thickness D of the transmission grating 44 through which the probe beam 28 propagates can be smaller than the height H, smaller than a diameter(s) of one or both of the pump laser beams 24, 26, and/or smaller than a diameter of the probe beam 28.

The medium 44 and/or the plasma grating 22 can have a sufficient thickness D to perform the diffraction. In some cases, the transmission grating 22 can have a finite thickness to reduce or impede energy from returning to the zeroth order beam. A minimum thickness D can depend on the amount of change applied by the interference pattern to the indices of refraction of the medium 44. The thickness of the medium 44 and/or the diffraction grating 22 can be about 10 times, about 20 time, about 30 times, about 40 times, about 50 times, about 60 times, about 70 times, about 75 times, about 85 times, about times, about 95 times, about 100 times, about 105 times, about 110 times, about 115 times, about 125 times, about 150 times, about 175 times, about 200 times, about 225 times, about 250 times, about 275 times, about 300 times, about 350 times, about 400 times, about 500 times, about 750 times, about 1000 times, about 1500 times, about 2000 times, about 2500 times, about 3000 times, about 4000 times, about 5000 times, about 7500 times, about times the wavelength of the light of the probe beam (e.g., average or predominant wavelength of the pulse bandwidth), or any values or ranges therebetween, although other configurations could be used. The thickness D of the medium 44 and/or grating 22 can be about 1 micron, about 5 microns, about 10 microns, about 15 microns, about 20 microns, about 30 microns, about 40 microns, about 40 microns, about 50 microns, about 60 microns, about 70 microns, about 80 microns, about 90 microns, about 100 microns, about 125 microns, about 150 microns, about 175 microns, about 200 microns, about 225 microns, about 250 microns, about 300 microns, about 400 microns, about 500 microns, about 750 microns, about 1000 microns, about 1.5 mm, about 2 mm, about 2.5 mm, about 5 mm, about 7.5 mm, about 10 mm, about 25 mm, about 50 mm, about 75 mm, about 100 mm, or any values or ranges therebetween, although other thickness could also be used in some cases.

The interference pattern 30 can produce index modulations on the order of about 1%, or the various other index modulation values discussed herein, which, although lower than the index modulation achievable with solid-state holograms, can be sufficient to construct a diffractive optic 22 for increasing temporal contrast, as discussed herein. The interference pattern 22 can produce an index modulation of the medium 44 of about 0.001%, about 0.002%, about 0.003%, about 0.005%, about 0.007%, about 0.01%, about 0.025%, about 0.05%, about 0.075%, about 0.1%, about 0.25%, about 0.5%, about 0.6%, about 0.7%, about 0.8%, about 0.9%, about 1%, about, 1.1%, about 1.2%, about 1.3%, about 1.4%, about 1.5%, about 1.6%, about 1.7%, about 1.8%, about 1.9%, about 2%, about 2.5%, about 5%, about 7.5%, about 10%, about 15%, about 20%, about 25%, about 30% or more, or any values or ranges between these values, although other index modulation amounts can be used in some cases. The interference pattern 30 can produce an index modulation of the medium 44 of about 0.0001 to 0.3, or any values or ranges therebetween, as discussed herein, although other configurations are possible.

In some implementations, the transient diffraction grating 22 has low angular dispersion with wavelength, for example, for light incident on said diffraction grating at the angle of the third (probe) beam 28. In some implementations, the angular dispersion with wavelength for said transient diffraction grating 22 formed in said medium 44 by said pump beams 24, 26 is in the range of from $1\times10^{-6}$ to $1\times10^{-2}$ degrees/nm for light incident on said diffraction grating at the angle of incidence of the probe beam 28. In some implementations, the angular dispersion with wavelength for said transient diffraction grating 22 formed in said medium 44 by said pump beams 24, 26 is in the range of from $5\times10^{-7}$ to $5\times10^{-2}$ degrees/nm or $1\times10^{-7}$ to $1\times10^{-1}$ degrees/nm or $1\times10^{-6}$ to $1\times10^{-2}$ degrees/nm or any range formed by any of these values for light incident on said diffraction grating at the angle of incident of the probe beam 28. In various implementations, the third (probe) beam 28 is incident on the transient grating 22 formed in said medium 44 at a small angle with respect to the normal to said transient diffraction grating. In some implementations, the third (probe) beam 28 is incident on the transient grating 22 formed in said medium 44 at an angle of from 0.1° to 10° or from 1° to 5° or from 1° to 15° or from 0.5° to 20° or from 0.2° to 3° with respect to the normal to said transient diffraction grating of any range formed by any of these values. In various implementations, the third (probe) beam 28 is incident on the transient grating 22 formed in said medium 44 at an angle with respect to the normal to said transient diffraction grating such that the angular dispersion of the transient grating is small or in a range, for example, from $1 \times 10^{-6}$ to $1 \times 10^{-2}$ degrees/nm. In various implementations, the third (probe) beam 28 incident on the transient grating 22 does not comprise different wavelengths at different angles. Rather, in some implementations, the third (probe) beam 28 incident on the transient grating 22 comprises different wavelengths incident at the same angle.

Although examples are show in the figures above, such as FIGS. 1-6, the features of these examples should not be considered limiting as the systems, devices, methods may be different and include a wide range of variations. For example, although transmission plasma grating have been shown, the plasma grating or ionization grating may comprise a reflection gratings. Such a reflection will have low or negligible dispersion. Additionally, although interference gratings with vertically oriented linear fringes and correspondingly shaped and arranged regions of the diffraction grating are shown, the fringes can be oriented differently and shaped different and need not be linear. Other patterns of fringes and corresponding regions of high and low index in the resultant diffraction grating are possible. Also, although the medium is shown as a gas exiting a jet in FIG. 4, the medium can be a solid held by a support or holder or can be inside a cell. Such a cell may, for example, include one or more window for input and output of the laser beams such as the first, second or third laser beams 24, 26, 28 or any combination thereof. Such a cell may in some cases comprise a flow cell, for example, with an inlet and outlet for the flow of gas or liquid.

Additionally, although a pulsed laser beam having a repetition rate of 10 Hz was discussed in connection with FIG. 1, the repetition rate need not be so limited. The laser beam 52 and/or the first and second pump beams 24, 26 and/or the third probe beam 28 and/or the diffracted beam or any combination of these, for example, may comprise pulse laser beams having a repetition rate from 100 kHz to 0.00001 Hz or any range formed by any values between this range e.g., 100 kHz or 10 kHz to 1 Hz, or 0.1 Hz or 0.01 Hz or 0.001 Hz or may be outside any of these ranges.

EXAMPLES

This disclosure provides various examples of devices, systems, and methods comprising for switching a plasma grating on to tailor the temporal characteristics of a laser pulse. Some such examples include but are not limited to the following examples.

Part I

Example 1: A laser system for producing laser pulses having increased temporal contrast, said laser system comprising:

a medium, a supply configured to provide a medium, or a support configured to hold the medium, said medium being able to be altered with light;

at least one laser and optics configured to provide first and second laser beams, each beam comprising a plurality of laser pulses, said laser and said optics arranged such that said first and second laser beams are disposed with respect to each other and with respect to the medium so that individual pulses from said first laser beam interfere with individual pulses from said second laser beam to form an interference pattern on the medium for a limited time to cause said medium to form a transient diffraction grating, said at least one laser and optics configured to provide a third beam comprising a plurality of pulses that pass through the transient diffraction grating such that a portion of said third beam is diffracted by said diffraction grating, individual ones of said laser pulses in said third beam that is incident on said transient diffraction grating comprising a peak accompanied by some light just prior in time to said peak, wherein said first and second laser beams each have an optical path distance to the location where said diffraction grating is formed, and said third laser beam has an optical path distance to said location where said diffraction grating is formed to cause the transient formation of said diffraction grating to be delayed in time with respect to said laser pulses in said third beam incident thereon so as to diffract said peak in said laser pulses in said third beam and reduce the amount of said light preceding said peak in the third beam that is diffracted by said transient diffraction grating.

Example 2: The laser system of Example 1, wherein said transient diffraction grating comprises an ionization grating.

Example 3: The laser system of Example 1, wherein said transient diffraction grating comprises an ionization grating formed by the ionization of matter in regions of said medium corresponding to bright fringes in said interference pattern.

Example 4: The laser system of any one of the examples above, wherein the medium comprises a gas.

Example 5: The laser system any of the examples above, wherein the supply comprises a gas supply line or conduit.

Example 6: The laser system of any of the examples above, further comprising a nozzle to produce a gas jet, wherein the medium comprises gas in said gas jet configured to be ionized by the first and second laser beams to form a plasma.

Example 7: The laser system of any one of Examples 1 to 3, wherein the medium comprises a liquid.

Example 8: The laser system of any one of Examples 1 to 3 or 7, wherein said supply comprises a liquid supply line or conduit.

Example 9: The optical system of any one of the examples above, further comprising said supply.

Example 10: The optical system of any one of the examples above, further comprising said support.

Example 11: The optical system of any one of the examples above, wherein said support comprises a cell.

Example 12: The optical system of any one of the examples above, wherein the medium is contained in a cell.

Example 13: The optical system of any one of said examples above, further comprising said medium.

Example 14: The laser system of any of the examples above, further comprising a vacuum chamber, wherein said transient diffraction grating is in said vacuum chamber.

Example 15: The laser system of any of the examples above, wherein said transient diffraction grating comprises a transmissive volume grating.

Example 16: The laser system of any of the examples above, wherein said transient diffraction grating has a thickness from 10 micrometers to 10 millimeters.

Example 17: The laser system of any of the examples above, wherein said transient diffraction grating comprises a reflective diffraction grating diffracting said third laser beam by reflecting said third laser beam therefrom.

Example 18: The laser system of any of the examples above, wherein the at least one laser comprises a single laser that is configured to produce the first, second, and third laser beams.

Example 19: The laser system of any one of the examples above, further comprising at least one beamsplitter to form at least one two of said first, second, or third laser beams from laser light emitted by said laser.

Example 20: The laser system of any of the examples above, further comprising at least two beamsplitters to form said first, second, and third laser beams from laser light emitted by said laser.

Example 21: The laser system of any of the examples above, wherein consecutive pulses in said third laser beam are spaced apart by a period in time, and the time separating the pre-pulse from said peak is less than said period between consecutive pulses in said third laser beam.

Example 22: The laser system of any of the examples above, further comprising an adjustable optical delay disposed in an optical path of light from said at least one laser to cause the transient formation of said diffraction grating to be delayed in time with respect to said laser pulses in said third beam so as to diffract said peak in said laser pulses in said third beam and reduce the amount of said pre-pulse light in the third beam that is diffracted by said transient diffraction grating.

Example 23: The laser system of Example 22 wherein said optical delay is disposed in an optical path of said third laser beam between the at least one laser and the transient diffraction grating such that the third laser beam propagates through said adjustable optical delay prior to reaching said transient diffraction grating.

Example 24: The laser system of any of Examples 22 or 23, wherein said adjustable optical delay comprises at least one optical element disposed on a translation stage translation of which increases or decreases the optical path length to said diffraction grating.

Example 25: The laser system of any of Examples 22-24, wherein said adjustable optical delay comprises at least one optical element disposed on an electrically controlled translation stage.

Example 26: The laser system of Examples 24 or 25, wherein said at least one optical element comprise one or more mirrors, reflectors, beamsplitters or any combination thereof.

Example 27: The laser system of any of Examples 22-26, wherein said adjustable optical delay is electrically connected to control electronics configured to adjust said adjustable optical delay such that interference of individual laser pulses in said first and second laser beams can be delayed with respect to an individual laser pulse in said third beam.

Example 28: The laser system of any of Examples 22-27, further comprising an optical detector disposed to receive at least a portion of said diffracted beam.

Example 29: The laser system of Example 28, wherein said optical detector is electrically connected to said control electronics, said control electronics configured to assess the temporal contrast of said optical pulse and adjust said adjustable optical delay to increase said temporal contrast by reducing said laser light preceding said peak with respect to said peak in said laser pulse of said third laser beam diffracted by said transient grating.

Example 30: The laser system of any of Examples 23-29, wherein said translation stage is electrically controlled by control electronics.

Example 31: The laser system of any of the examples above, wherein said optics are arranged such that said first and second laser beams are incident on the medium at an angle with respect to each other.

Example 32: The laser system of any of the examples above, wherein said laser and optics are arranged such that said third laser beam is incident on said medium at an angle different from said first and second laser beams.

Example 33: The laser system of any of the examples above, wherein said laser and optics are arranged such that said third laser beam is incident on said medium at an angle of between 0.1° and 10°.

Example 34: The laser system of any of the examples above, wherein transient diffraction grating comprises negligible optical power.

Example 35: The laser system of any of the examples above, wherein said third laser beam incident on said diffraction grating does not comprise different wavelengths incident on said the diffraction grating at different incoming angles.

Example 36: The laser system of any of the examples above, wherein said the diffraction grating formed in the medium is configured to diffract light in said third beam so that the light of different wavelengths is diffracted by substantially the same amount.

Example 37: The laser system of any of the examples above, wherein said third beam is incident on said diffraction grating at an angle such that said the diffraction grating has reduced wavelength dispersion for light incident at said angle.

Example 38: The laser system of any of the examples above, wherein said laser and optics are arranged such that said third laser beam is incident on said medium at the Bragg angle of said diffraction grating and said Bragg angle is configured to provide negligible dispersion.

Example 39: The laser system of any of the examples above, wherein said third beam is incident on said diffraction grating at an angle and said the diffraction grating formed in the medium is configured to have an angular dispersion with wavelength in the range of from $1\times10^{-6}$ to $1\times10^{-2}$ degrees/nm for light incident on said diffraction grating at said angle.

Example 40: The laser system of any of the examples above, configured so that the first laser beam is incident on the medium at a first angle, and wherein the second laser beam is incident on the medium at a second angle that is different from the first angle.

Example 41: The laser system of Example 40, wherein the first angle and the second angle have substantially the same magnitude and substantially opposite directions relative to a line normal to the medium.

Example 42: The laser system of any of the examples above, wherein the interference pattern between the first laser beam and the second laser beam creates a plurality of linear fringes.

Example 43: The laser system of any of the examples above, wherein the interference pattern is configured to alter an index of refraction of the medium to produce said transient diffractive grating.

Example 44: The laser system of any of the examples above, wherein the medium has an index of refraction that is dependent on light intensity.

Example 45: The laser system of any one of the examples above, wherein the diffractive grating is a plasma grating.

Example 46: The laser system of any of the examples above, wherein the medium comprises gas configured to be ionized by the first and second laser beams to form a plasma.

Example 47: The laser system of Example 46, wherein the plasma has a different index of refraction than the gas.

Example 48: The laser system of any of the examples above, wherein the interference pattern is configured to form a distribution of plasma from a nonlinear medium so as to produce the diffraction grating.

Example 49: The laser system of Example 48, wherein the interference pattern and the plasma distribution have the same pattern.

Example 50: The laser system of any one of said examples above, further comprising said medium.

Example 51: The laser system of any one of said examples above, having an efficiency of between 60% and 99.9%, where efficiency is the percent of the light in the peak diffracted by the diffraction gating.

Part II

Example 1: An optical system for increasing the temporal contrast of laser pulses, said system comprising:

a medium, a supply configured to provide a medium, or a support configured to hold the medium, said medium being able to be altered with light;

optics configured to receive at least one pulsed laser beam and to provide first and second laser beams, each beam comprising a plurality of laser pulses, said optics arranged such that said first and second laser beams are disposed with respect to each other and with respect to the medium so that individual pulses from said first laser beam interfere with individual pulses from said second laser beam to form an interference pattern on the medium for a limited time to cause said medium to form a transient diffraction grating, said optics configured to provide a third beam comprising a plurality of pulses that pass through the transient diffraction grating such that a portion of said third beam is diffracted by said diffraction grating, individual ones of said laser pulses in said third beam that is incident on said transient diffraction grating comprising a peak accompanied by some light just prior in time to said peak, wherein said first and second laser beams each have an optical path distance to the location where said diffraction grating is formed, and said third laser beam has an optical path distance to said location where said diffraction grating is formed to cause the transient formation of said diffraction grating to be delayed in time with respect to said laser pulses in said third beam incident thereon so as to diffract said peak in said laser pulses in said third beam and reduce the amount of said light preceding said peak in the third beam that is diffracted by said transient diffraction grating.

Example 2: The optical system of Example 1, wherein said transient diffraction grating comprises an ionization grating.

Example 3: The optical system of Example 1, wherein said transient diffraction grating comprises an ionization grating formed by the ionization of matter in regions of said medium corresponding to bright fringes in said interference pattern.

Example 4: The optical system of any one of the examples above, wherein the medium comprises a gas.

Example 5: The optical system any of the examples above, wherein the supply comprises a gas supply line or conduit.

Example 6: The optical system of any of the examples above, further comprising a nozzle to produce a gas jet, wherein the medium comprises gas in said gas jet configured to be ionized by the first and second laser beams to form a plasma.

Example 7: The optical system of any one of Examples 1 to 3, wherein the medium comprises a liquid.

Example 8: The optical system of any one of Examples 1 to 3 or 7, wherein said supply comprises a liquid supply line or conduit.

Example 9: The optical system of any one of the examples above, further comprising said supply.

Example 10: The optical system of any one of the examples above, further comprising said support.

Example 11: The optical system of any one of the examples above, wherein said support comprises a cell.

Example 12: The optical system of any one of the examples above, wherein the medium is contained in a cell.

Example 13: The optical system of any one of said examples above, further comprising said medium.

Example 14: The optical system of any of the examples above, further comprising a vacuum chamber, wherein said transient diffraction grating is in said vacuum chamber.

Example 15: The optical system of any of the examples above, wherein said transient diffraction grating comprises a transmissive volume grating.

Example 16: The optical system of any of the examples above, wherein said transient diffraction grating has a thickness from 10 micrometers to 10 millimeters.

Example 17: The optical system of any of the examples above, wherein said transient diffraction grating comprises a reflective diffraction grating diffracting, said third laser beam by reflecting said third laser beam therefrom.

Example 18: The optical system of any of the examples above, wherein the at least one laser comprises a single laser that is configured to produce the first, second, and third laser beams.

Example 19: The optical system of any one of the examples above, further comprising at least one beamsplitter to provide at least one two of said first, second, or third laser beams from laser light emitted by said laser.

Example 20: The optical system of any one of Examples 1 to 19, further comprising at least two beamsplitters to provide said first, second, and third laser beams from laser light emitted by said laser.

Example 21: The optical system of any of the examples above, wherein consecutive pulses in said third laser beam are spaced apart by a period in time, and the time separating the pre-pulse from said peak is less than said period between consecutive pulses in said third laser beam.

Example 22: The optical system of any of the examples above, further comprising an adjustable optical delay disposed in an optical path of light from said at least one laser to cause the transient formation of said diffraction grating to be delayed in time with respect to said laser pulses in said third beam so as to diffract said peak in said laser pulses in said third beam and reduce the amount of said pre-pulse light in the third beam that is diffracted by said transient diffraction grating.

Example 23: The optical system of Example 22 wherein said adjustable optical delay is disposed in an optical path of said third laser beam between the at least one laser and the transient diffraction grating such that the third laser beam propagates through said adjustable optical delay prior to reaching said transient diffraction grating.

Example 24: The optical system of any of Examples 22 or 23, wherein said adjustable optical delay comprises at least one optical element disposed on a translation stage translation of which increases or decreases the optical path length to said diffraction grating.

Example 25: The optical system of any of Examples 22-24, wherein said adjustable optical delay comprises at least one optical element disposed on an electrically controlled translation stage.

Example 26: The optical system of Examples 24 or 25, wherein said at least one optical element comprise one or more mirrors, reflectors, beamsplitters or any combination thereof.

Example 27: The optical system of any of Examples 22-26, wherein said adjustable optical delay is electrically connected to control electronics configured to adjust said adjustable optical delay such that interference of individual laser pulses in said first and second laser beams can be delayed with respect to an individual laser pulse in said third beam.

Example 28: The optical system of any of Examples 22-27, further comprising an optical detector disposed to receive at least a portion of said diffracted beam.

Example 29: The optical system of Example 28, wherein said optical detector is electrically connected to said control electronics, said control electronics configured to assess the temporal contrast of said optical pulse and adjust said adjustable optical delay to increase said temporal contrast by reducing said laser light preceding said peak with respect to said peak in said laser pulse of said third laser beam diffracted by said transient grating.

Example 30: The optical system of any of Examples 23-29, wherein said translation stage is electrically controlled by control electronics.

Example 31: The optical system of any of the examples above, wherein said optics are arranged such that said first and second laser beams are incident on the medium at an angle with respect to each other.

Example 32: The optical system of any of the examples above, wherein said optics are arranged such that said third laser beam is incident on said medium at an angle different from said first and second laser beams.

Example 33: The optical system of any of the examples above, wherein said optics are arranged such that said third laser beam is incident on said medium at an angle of between 0.1° and 10°.

Example 34: The optical system of any one of the examples above, wherein transient diffraction grating comprises negligible optical power.

Example 35: The optical system of any one of the examples above, wherein said third laser beam incident on said diffraction grating does not comprise different wavelengths incident on said the diffraction grating at different incoming angles.

Example 36: The optical system of any of the examples above, wherein said the diffraction grating formed in the medium is configured to diffract light in said third beam so that the light of different wavelengths is diffracted by substantially the same amount.

Example 37: The optical system of any of the examples above, wherein said third beam is incident on said diffraction grating at an angle such that said the diffraction grating has reduced wavelength dispersion for light incident at said angle.

Example 38: The optical system of any of the examples above, wherein said optics are arranged such that said third laser beam is incident on said medium at the Bragg angle of said diffraction grating and said Bragg angle is configured to provide negligible angular dispersion.

Example 39: The optical system of any of the examples above, wherein said third beam is incident on said diffraction grating at an angle and said the diffraction grating formed in the medium is configured to have an angular dispersion with wavelength in the range of from $1\times10^{-6}$ to $1\times10^{-2}$ degrees/nm for light incident on said diffraction grating at said angle.

Example 40: The optical system of any of the examples above, configured so that the first laser beam is incident on the medium at a first angle, and wherein the second laser beam is incident on the medium at a second angle that is different from the first angle.

Example 41: The optical system of Example 40, wherein the first angle and the second angle have substantially the same magnitude and substantially opposite directions relative to a line normal to the medium.

Example 42: The optical system of any of the examples above, wherein the interference pattern between the first laser beam and the second laser beam creates a plurality of linear fringes.

Example 43: The optical system of any of the examples above, wherein the interference pattern is configured to alter an index of refraction of the medium to produce said transient diffractive grating.

Example 44: The optical system of any of the examples above, wherein the medium has an index of refraction that is dependent on light intensity.

Example 45: The optical system of any one of the examples above, wherein the diffractive grating is a plasma grating.

Example 46: The optical system of any of the examples above, wherein the medium comprises gas configured to be ionized by the first and second laser beams to form a plasma.

Example 47: The optical system of Example 46, wherein the plasma has a different index of refraction than the gas.

Example 48: The optical system of any of the examples above, wherein the interference pattern is configured to form a distribution of plasma from said medium so as to produce the diffraction grating.

Example 49: The optical system of Example 48, wherein the interference pattern and the plasma distribution have the same pattern.

Example 50: The optical system of any one of said examples above, having an efficiency of between 60% and 99.9%, where efficiency is the percent of the light in the peak diffracted by the diffraction gating.

Part III

Example 1: A method of increasing the temporal contrast of laser pulses, said method comprising:

providing a medium, a supply configured to provide a medium, or a support configured to hold the medium, said medium being able to be altered with light;

receiving at least one pulsed laser beam and provide first and second laser beams, each beam comprising a plurality of laser pulses;

disposing said first and second laser beams with respect to each other and with respect to the medium so that individual pulses from said first laser beam interfere with individual pulses from said second laser beam to form an interference pattern on the medium for a limited time to cause said medium to form a transient diffraction grating;

providing a third beam comprising a plurality of pulses that pass through the transient diffraction grating such that a portion of said third beam is diffracted by said diffraction grating, individual ones of said laser pulses in said third beam that is incident on said transient diffraction grating comprising a peak accompanied by some light just prior in time to said peak, wherein said diffraction grating is formed to cause the transient formation of said diffraction grating to be delayed in time with respect to said laser pulses in said third beam incident thereon so as to diffract said peak in said laser pulses in said third beam and reduce the amount of said light preceding said peak in the third beam that is diffracted by said transient diffraction grating.

Example 2: The method of Example 1, wherein said transient diffraction grating comprises an ionization grating formed by the ionization of matter in regions of said medium corresponding to bright fringes in said interference pattern.

Example 3: The method of any one of the examples above, wherein the medium comprises a gas.

Example 4: The method of any one of the examples above, wherein said transient diffraction grating comprises a transmissive volume grating.

Example 5: The method of any one of the examples above, wherein said transient diffraction grating comprises a reflective diffraction grating diffracting said third laser beam by reflecting said third laser beam therefrom.

Example 6: The method of any one of the examples above, wherein the first, second, and third laser beams are produced from a single laser.

Example 7: The method of any one of the examples above, further comprising causing the transient formation of said diffraction grating to be delayed in time with respect to said laser pulses in said third beam so as to diffract said peak in said laser pulses in said third beam and reduce the amount of said pre-pulse light in the third beam that is diffracted by said transient diffraction grating.

Example 8: The method of any one of the examples above, further comprising adjusting the optical path length of the first, second, or third laser beams, or any combination thereof, such that interference of individual laser pulses in said first and second laser beams and said transient formation of said diffraction grating can be delayed with respect to an individual laser pulse in said third beam.

Example 9: The method of any one of the examples above, further comprising disposing an optical detector to receive at least a portion of said diffracted beam.

Example 10: The method of Example 9, further comprising assessing the temporal contrast of said optical pulse of the third laser beam diffracted by said transient diffraction grating and adjusting the optical delay to increase the temporal contrast by reducing said laser light preceding said peak with respect to said peak in said laser pulse of said third laser beam diffracted by said transient diffraction grating.

Example 11: The method of any one of the examples above, wherein said first and second laser beam are incident on the medium at an angle with respect to each other.

Example 12: The method of any one of the examples above, wherein said transient diffraction grating comprises negligible optical power.

Example 13: The method of any one of the examples above, wherein said third laser beam incident on said diffraction grating does not comprise different wavelengths incident on said the diffraction grating at different incoming angles.

Example 14: The method of any one of the examples above, wherein said third laser beam is incident on said transient diffraction grating at an angle and said transient diffraction grating formed in the medium is configured to have an angular dispersion with wavelength in the range of from $1\times10^{-6}$ to $1\times10^{-2}$ degrees/nm for light incident on said diffraction grating at said angle.

Any of the Examples and/or features thereof set forth in Parts I and II can be combined with any of the Examples and/or features thereof set forth in in Part III. Similarly, any of the Examples and/or features thereof set forth in Part I can be combined with any of the Example and/or features thereof set forth in Part II and vice versa.

Additional Information

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A laser system for producing laser pulses having increased temporal contrast, said laser system comprising:
   a supply configured to provide a medium that can be altered with light;
   at least one laser and optics configured to provide first and second laser beams, each beam comprising a plurality of laser pulses, said laser and said optics arranged such that said first and second laser beams are disposed with respect to each other and with respect to the medium so that individual pulses from said first laser beam interfere with individual pulses from said second laser beam to form an interference pattern on the medium for a limited time to cause said medium to form a transient plasma diffraction grating that persists for at least about 1 ps after the end of the respective pulses from said first laser beam and the second laser beam, said at least one laser and optics configured to provide a third beam comprising a plurality of pulses that pass through the transient plasma diffraction grating such that a portion of said third beam is diffracted by said plasma diffraction grating, individual ones of said laser pulses in said third beam that is incident on said transient plasma diffraction grating comprising a peak accompanied by some light just prior in time to said peak,
   wherein said first and second laser beams each have an optical path distance to the location where said plasma diffraction grating is formed, and said third laser beam has an optical path distance to said location where said plasma diffraction grating is formed to cause the transient formation of said plasma diffraction grating to be delayed in time with respect to said laser pulses in said third beam incident thereon so as to diffract said peak in said laser pulses in said third beam and reduce the amount of said light preceding said peak in the third beam that is diffracted by said transient plasma diffraction grating.

2. The laser system of claim 1, wherein said transient plasma diffraction grating comprises an ionization grating formed by the ionization of matter in regions of said medium corresponding to bright fringes in said interference pattern.

3. The laser system of claim 1, wherein the medium comprises a gas.

4. The laser system of claim 1, wherein said transient plasma diffraction grating comprises a transmissive volume grating.

5. The laser system of claim 1, wherein said transient plasma diffraction grating comprises a reflective diffraction grating diffracting said third laser beam by reflecting said third laser beam therefrom.

6. The laser system of claim 1, wherein the at least one laser comprises a single laser that is configured to produce the first, second, and third laser beams.

7. The laser system of claim 6, further comprising at least two beamsplitters to form said first, second, and third laser beams from laser light emitted by said laser.

8. The laser system of claim 1, further comprising an optical delay disposed in an optical path of light from said at least one laser to cause the transient formation of said plasma diffraction grating to be delayed in time with respect to said laser pulses in said third beam so as to diffract said peak in said laser pulses in said third beam and reduce the amount of said pre-pulse light in the third beam that is diffracted by said transient plasma diffraction grating.

9. The laser system of any of claim 8, wherein said optical delay is electrically connected to control electronics configured to adjust said optical delay such that interference of individual laser pulses in said first and second laser beams and to said transient formation of said plasma diffraction grating can be delayed with respect to an individual laser pulse in said third beam.

10. The laser system of any of claim 9, further comprising an optical detector disposed to receive at least a portion of said diffracted beam.

11. The laser system of claim 10, wherein said optical detector is electrically connected to said control electronics, said control electronics configured to assess the temporal contrast of said optical pulse and adjust said optical delay to increase said temporal contrast by reducing said laser light preceding said peak with respect to said peak in said laser pulse of said third laser beam diffracted by said transient plasma diffraction grating.

12. The laser system of claim 1, wherein said optics are arranged such that said first and second laser beam are incident on the medium at an angle with respect to each other.

13. The laser system of claim 1, wherein the transient plasma diffraction grating has no optical power or optical power with magnitude of less than $0.1 \text{ m}^{-1}$.

14. The laser system of claim 1, wherein said third laser beam incident on said plasma diffraction grating does not comprise different wavelengths incident on said the plasma diffraction grating at different incoming angles.

15. The laser system of claim 1, wherein said third beam is incident on said plasma diffraction grating at an angle and said the plasma diffraction grating formed in the medium is configured to have an angular dispersion with wavelength in the range of from $1\times10^{-6}$ to $1\times10^{-2}$ degrees/nm for light incident on said plasma diffraction grating at said angle.

16. The laser system of claim 1, wherein the transient plasma diffraction grating persists for at least about 5 ps after the end of the respective pulses from said first laser beam and the second laser beam.

17. The laser system of claim 1, wherein the transient plasma diffraction grating persists for at least about 10 ps after the end of the respective pulses from said first laser beam and the second laser beam.

18. The laser system of claim 1, wherein the transient plasma diffraction grating persists after the end of the respective pulses from said first laser beam and the second laser beam for a time that is longer than the pulses from said first laser beam and the second laser beam.

19. The laser system of claim 1, wherein the transient plasma diffraction grating persists after the end of the respective pulses from said first laser beam and the second laser beam for a time that is about 2 times longer than the pulses from said first laser beam and the second laser beam.

20. The laser system of claim 1, wherein the transient plasma diffraction grating persists after the end of the respective pulses from said first laser beam and the second laser beam for a time that is about 5 times longer than the pulses from said first laser beam and the second laser beam.

\* \* \* \* \*